(12) United States Patent
Vinod et al.

(10) Patent No.: US 12,312,102 B2
(45) Date of Patent: May 27, 2025

(54) SYSTEM AND METHOD FOR CONTROLLING A MOTION OF A SPACECRAFT IN A MULTI-OBJECT CELESTIAL SYSTEM

(71) Applicant: Mitsubishi Electric Research Laboratories, Inc., Cambridge, MA (US)

(72) Inventors: Abraham Vinod, Cambridge, MA (US); Avishai Weiss, Boston, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 548 days.

(21) Appl. No.: 17/646,491

(22) Filed: Dec. 30, 2021

(65) Prior Publication Data
US 2023/0182927 A1 Jun. 15, 2023

Related U.S. Application Data

(60) Provisional application No. 63/288,086, filed on Dec. 10, 2021.

(51) Int. Cl.
*B64G 1/24* (2006.01)
*B64G 1/64* (2006.01)

(52) U.S. Cl.
CPC ............ *B64G 1/242* (2013.01); *B64G 1/646* (2013.01)

(58) Field of Classification Search
CPC .................................................. B64G 1/242
See application file for complete search history.

(56) References Cited

U.S. PATENT DOCUMENTS 11,858,121 B2 * 1/2024 Duke ..................... G06N 3/08
2008/0098711 A1 * 5/2008 DiSalvo .................. F02K 9/58
60/211

(Continued)

FOREIGN PATENT DOCUMENTS

| CN | 102707724 B | * | 1/2015 | |
| WO | WO-2020181962 A1 | * | 9/2020 | ........... G06N 3/0445 |
| WO | WO-2022068155 A1 | * | 4/2022 | ......... G05B 23/0243 |

OTHER PUBLICATIONS

Goo, Dengwei, et al., Online feedback motion planning for spacecraft obstacle avoidance using positively invariant sets, Advances in Space Research vol. 65, Issue 10, May 15, 2020, pp. 2424-2434 (https://www.sciencedirect.com/science/article/pii/S0273117720300685) (hereinafter "Goo"). (Year: 2020).*

(Continued)

*Primary Examiner* — Jean Paul Cass
(74) *Attorney, Agent, or Firm* — Gene Vinokur

(57) ABSTRACT

The present disclosure provides a system and a method for controlling a motion of a spacecraft in a multi-object celestial system while avoiding an unauthorized entry into a keep-away region during a normal and an abnormal operation of the spacecraft. The method includes executing, during the normal operation of the spacecraft, a nominal control law subject to constraints on maintaining a state of the spacecraft within a union of a plurality of control invariant sets of values of the state of the spacecraft. The state of the spacecraft includes a location of the spacecraft and at least one or a combination of a velocity and an acceleration of the spacecraft. The method further includes executing, upon detecting the abnormal operation of the spacecraft, an abort control law associated with the control invariant set including a current state of the spacecraft.

19 Claims, 20 Drawing Sheets

(56) References Cited

U.S. PATENT DOCUMENTS

2022/0363415 A1* 11/2022 Conn .................... B64G 1/242
2023/0152458 A1* 5/2023 Nuss ...................... G01P 15/14
   356/4.01
2023/0182927 A1* 6/2023 Vinod ................... B64G 1/361
   244/169

OTHER PUBLICATIONS

Machine Translation of International Patent Pub. No. WO 2022068155 A1 to Zou that was filed in Mar. 23, 2021.*
Machine Translation of International Patent Application Pub. No. WO2020181962A1 to Chen.*
Machine Translation of Chinese Patent Pub. No. CN102707724B.*
Machine Translation of CN106707751B.*
Gleason et al., Lagrangian Approximations for Stochastic Reachability of a Target Tube. Preprint submitted to Automatica. Oct. 30, 2020.
Berning et al., "Spacecraft Relative Motion Planning using Chained Chance-Constrained Admissible Sets." arxiv:1910.08048v1. [eess.SY] Oct. 17, 2019.

* cited by examiner

SYSTEM AND METHOD FOR CONTROLLING A MOTION OF A SPACECRAFT IN A MULTI-OBJECT CELESTIAL SYSTEM

TECHNICAL FIELD

The present disclosure relates generally to controlling of a motion of a spacecraft, and more specifically to a system and a method for controlling a motion of a spacecraft in a multi-object celestial system while avoiding an unauthorized entry into a keep-away region during a normal and an abnormal operation of the spacecraft.

BACKGROUND

Spacecraft rendezvous is a set of orbital maneuvers during performance of which, two spacecrafts, i.e. chaser spacecraft and a target or space station, arrive at the same orbit and approach to a close distance (e.g. within visual contact). The spacecraft rendezvous requires a precise match of orbital velocities and position vectors of the two spacecrafts, allowing them to remain at a constant distance through orbital station-keeping. The spacecraft rendezvous may or may not be followed by docking or berthing, procedures which bring the spacecrafts into a physical contact and create a link between them. Further, the same spacecraft rendezvous may be used for spacecraft "landing" on natural objects if there is a weak gravitational field, e.g., landing on an asteroid or on one of Martian moons. The spacecraft landing on the natural objects may also be same as matching of orbital velocities, followed by a "descent" that shares similarities with docking.

However, the spacecraft rendezvous with the target is a challenging task. A critical criterion for the spacecraft rendezvous is maintenance of safety, that is, an ability to avoid a collision between the chaser spacecraft and the target, in an event of partial thruster failure. In the event of partial thruster failure, the chaser spacecraft may deviate from its nominal approach in proximity to the target. When the chaser spacecraft deviates significantly from its nominal approach in proximity to the target and its current trajectory is not passively safe, a predetermined active collision avoidance maneuver (CAM) is engaged. However, depending on approach trajectory and extent of the partial thruster failure, the CAM may not always be possible.

Further, for spacecraft motion planning, mathematical models are used to predict a trajectory when a particular sequence of thrusters is applied over time to the chaser spacecraft. However, in practice, true spacecraft motion may deviate from the trajectory predicted by the mathematical models. Such deviations may arise due to various reasons, including an actuation mismatch, a measurement noise, and unmodeled phenomena. The actuation mismatch arises from thruster misalignment and limitations of hardware onboard of the chaser spacecraft. The measurement noise may arise due to sensors' sensing limitations that result in inaccurate information regarding chaser spacecraft state including position and velocity of the chaser spacecraft. Also, it is common to exclude complex phenomena, which may have minor effect on the trajectories, for the sake of computation and interpretability of the mathematical models.

Therefore, there is a need for an improved way to control an operation of the chaser spacecraft for safe rendezvous in the event of actuation failure and in presence of the actuation mismatch, the measurement noise and other uncertainties.

SUMMARY

It is an object of some embodiments provide a system and a method for controlling a motion of a spacecraft in a multi-object celestial system while avoiding an unauthorized entry into a keep-away region during a normal and abnormal operation of the spacecraft. As used herein, the normal operation includes moving toward a target in the keep-away zone, and the abnormal operation includes one or a combination of a failure to receive an authorization to enter the keep-away zone and a failure of at least one component of the spacecraft. This problem comes from requirements of spacecraft motion and rendezvous of multiple spacecraft forming a multi-object celestial system to ensure additional safety in space collaboration. To that end, it is an object of one embodiment to control the motion of the spacecraft toward the keep-away region such that upon detecting the abnormal operation there is a high likelihood of a possibility to move the spacecraft while avoiding the keep-away zone.

Some embodiments are based on a recognition that there are states of the spacecraft in proximity of the keep-away zone that may unavoidably lead the spacecraft into the keep-away zone even if the authorization to enter is rejected based on any reason including a total or partial failure of propulsion of the spacecraft. As used herein, the state of the spacecraft includes a location of the spacecraft and at least one or a combination of a velocity and an acceleration of the spacecraft. Additionally, internal and external forces acting on the spacecraft during its motion, such as inertia and force of gravity, may change the state of the spacecraft to specific states that may lead the spacecraft into the keep-away zone, regardless of any efforts that the spacecraft may perform.

Some embodiments are based on the realization that this problem can be addressed by using a control invariant set of values of the state of the spacecraft that the spacecraft should be within. As used herein, a control invariant set is determined such that when the state of the spacecraft is within a control invariant set there is a control command produced by a control law that maintains the state of the spacecraft within the control invariant set despite the internal and external forces acting on the spacecraft. In such a manner, if the spacecraft is within the control invariant set, a control law within specified control limits exists such that the spacecraft does not enter the keep-away zone.

Since the control invariant set depends on the control limits, some embodiments determine multiple control invariant sets forming a union of a plurality of control invariant sets of values of the state of the spacecraft. The union of the plurality of control invariant sets may partially enclose the keep-away zone. In some other embodiments, the union of the plurality of control invariant sets may completely enclose the keep-away zone. Further, to control the motion of the spacecraft in an event of the abnormal operation, each control invariant set is determined such that there is an abnormal control law that respects the actuation limits associated with the abnormality and safely aborts the motion of the spacecraft.

Some embodiments are based on recognition that it is computationally expensive to compute the control invariant sets online, i.e., during real-time controlling of the spacecraft. To mitigate this problem, the control invariant sets and the corresponding abort control laws are determined offline, i.e., in advance. Specifically, the abort control law is jointly and interdependently determined for the corresponding control invariant set to produce abort control commands. The offline determined control invariant sets and the corresponding abort laws may be stored in a controller that is used to control the motion of the spacecraft.

To that end, during online control of the spacecraft under the abnormal operation, the controller receives a current state of the spacecraft. Further, the processor selects a control invariant set that includes the current state of the spacecraft. Furthermore, the controller executes the abort control law corresponding to the selected control invariant set. Hence, in different states in which the abnormal operation is detected, the controller may use different predetermined abort control laws, thereby reducing the computational burden, and reducing latency of reaction when the abnormal operation is detected.

Some embodiments are based on a recognition that the motion of the spacecraft is subject to an unbounded stochastic uncertainty. The unbounded stochastic uncertainty includes a probabilistic distribution of process noise. The process noise may specify an actuation mismatch and/or unmodeled dynamics of the motion of the spacecraft. In addition to the process noise, the unbounded stochastic uncertainty may include a probabilistic distribution of measurement noise of an estimation of the state of the spacecraft. Since the motion of the spacecraft is subject to the unbounded stochastic uncertainty, there is a need to avoid the unauthorized entry of the spacecraft into the keep-away zone with a prescribed safety likelihood in consideration of the unbounded stochastic uncertainty.

Some embodiments are based on understanding that it is possible to control the motion of the spacecraft with the prescribed safety likelihood. For example, different methods enforcing the motion under the unbounded stochastic uncertainty include chance constraints, particle filtering, scenario optimization, and stochastic tube methods. To that end, it may be assumed that it is possible to control the motion of the spacecraft within the union of the plurality of control invariant sets with the prescribed safety likelihood. However, such an assumption is based on a notion that each control invariant set is determined deterministically, i.e., without the unbounded stochastic uncertainty. However, such an assumption may be incorrect because if there is any uncertainty in the motion of the spacecraft during its online control, the same or similar uncertainty exists during calculation of the control invariant sets.

To that end, some embodiments are based on the realization that each control invariant set should inner-approximate the values of the state of the spacecraft to guarantee control invariance under the unbounded stochastic uncertainty. Moreover, such a guarantee should be with a likelihood of the unbounded stochastic uncertainty greater than the prescribed safety likelihood. This is because ultimate stochastic guarantee of the motion control is a function of a product of the likelihood of the control invariance under the unbounded stochastic uncertainty and a likelihood of a motion that satisfies constraints derived from the control invariant sets. Because of the unbounded stochastic uncertainty, all of these likelihoods are less than one and thus needs to be considered together to ensure the prescribed safety likelihood.

Therefore, each control invariant set inner-approximates the values of the state of the spacecraft to guarantee the control invariance with a first likelihood of the unbounded stochastic uncertainty greater than the prescribed safety likelihood. The control law is configured to produce a control command maintaining the state of the spacecraft within the union of the control invariant sets with a second likelihood selected such that a product of the first likelihood and the second likelihood equals or is greater than the prescribed safety likelihood.

Some embodiments use various techniques to compute the control invariant sets for dynamics of the spacecraft under the unbounded stochastic uncertainty. For example, one embodiment uses stochastic reachable sets to determine the control invariant sets. This embodiment is advantageous when the control invariant set to stay within is convex but can be suboptimal when the uncertainties have probability densities with fat tails. When the uncertainties have probability density with fat tails, an estimated uncertainty range for the computation of the control invariant set becomes larger, leading to a severe reduction in a volume of the computed control invariant set. Since the control invariant set restricts the states admissible for the normal operation, it is desirable to have large control invariant sets. For the problems of interest, the uncertainties have thin tails since they are Gaussian uncertainties.

Additionally or alternatively, the control invariant sets can be computed by leveraging robust controlled invariant sets. The robust controlled invariant sets determine a set of states from which safety can be maintained despite bounded, non-stochastic uncertainties. Various computational algorithms can be used for computing the robust controlled invariant sets. However, these algorithms are not directly applicable to the problem with the presence of unbounded, stochastic uncertainties including the probabilistic distribution of the process and/or the measurement noise. This is because the computational algorithms are applicable to a problem with presence of bounded, deterministic uncertainties.

To mitigate this problem, the unbounded stochastic uncertainties are transformed into bounded deterministic uncertainties with a predefined likelihood specifying a range of values on the unbounded stochastic uncertainties. To that end, the computational algorithms can be used to compute the robust controlled invariant set. Further, based on the computed robust controlled invariant sets, the control invariant sets can be determined.

Accordingly, one embodiment discloses a controller for controlling a motion of a spacecraft in a multi-object celestial system while avoiding an unauthorized entry into a keep-away zone during a normal and an abnormal operation of the spacecraft, wherein the normal operation includes moving toward the keep-away zone, and wherein the abnormal operation includes one or a combination of a failure to receive an authorization to enter the keep-away zone and a failure of at least one component of the spacecraft. The controller comprises at least one processor and a memory having instructions stored thereon that, when executed by the at least one processor, cause the controller to: execute, during the normal operation of the spacecraft, a nominal control law subject to constraints on maintaining a state of the spacecraft within a union of a plurality of control invariant sets of values of the state of the spacecraft that partially or completely enclose the keep-away zone, wherein the state of the spacecraft includes a location of the spacecraft and at least one or a combination of a velocity and an acceleration of the spacecraft, wherein each of the plurality of control invariant sets is determined such that when the state of the spacecraft is within a control invariant set there is a control command produced by the nominal control law that maintains the state of the spacecraft within the control invariant set despite internal and external forces acting on the spacecraft; and execute, upon detecting the abnormal operation of the spacecraft, an abort control law associated with the control invariant set including a current state of the spacecraft, wherein at least some different abort control laws are associated with at least some different control invariant sets, and wherein the abort control law is jointly and interdependently determined for the corresponding control invariant set to produce abort control commands moving the spacecraft while avoiding the keep-away zone for any state within the corresponding control invariant set.

Accordingly, another embodiment discloses a tracking method for controlling a motion of a spacecraft in a multi-object celestial system while avoiding an unauthorized entry into a keep-away zone during a normal and an abnormal operation of the spacecraft, wherein the normal operation includes moving toward the keep-away zone, and wherein the abnormal operation includes one or a combination of a failure to receive an authorization to enter the keep-away zone and a failure of at least one component of the spacecraft. The method includes executing, during the normal operation of the spacecraft, a nominal control law subject to constraints on maintaining a state of the spacecraft within a union of a plurality of control invariant sets of values of the state of the spacecraft that partially or completely enclose the keep-away zone, wherein the state of the spacecraft includes a location of the spacecraft and at least one or a combination of a velocity and an acceleration of the spacecraft. Each of the plurality of control invariant sets is determined such that when the state of the spacecraft is within a control invariant set, there is a control command produced by the nominal control law that maintains the state of the spacecraft within the control invariant set despite internal and external forces acting on the spacecraft. The method further includes executing, upon detecting the abnormal operation of the spacecraft, an abort control law associated with the control invariant set including a current state of the spacecraft, wherein at least some different abort control laws are associated with at least some different control invariant sets, and wherein the abort control law is jointly and interdependently determined for the corresponding control invariant set to produce abort control commands moving the spacecraft while avoiding the keep-away zone for any state within the corresponding control invariant set.

Accordingly, yet another embodiment discloses a non-transitory computer-readable storage medium embodied thereon a program executable by a processor for performing a method for controlling a motion of a spacecraft in a multi-object celestial system while avoiding an unauthorized entry into a keep-away zone during a normal and an abnormal operation of the spacecraft, wherein the normal operation includes moving toward the keep-away zone, and wherein the abnormal operation includes one or a combination of a failure to receive an authorization to enter the keep-away zone and a failure of at least one component of the spacecraft. The method comprises: executing, during the normal operation of the spacecraft, a nominal control law subject to constraints on maintaining a state of the spacecraft within a union of a plurality of control invariant sets of values of the state of the spacecraft that partially or completely enclose the keep-away zone, wherein the state of the spacecraft includes a location of the spacecraft and at least one or a combination of a velocity and an acceleration of the spacecraft, wherein each of the plurality of control invariant sets is determined such that when the state of the spacecraft is within a control invariant set there is a control command produced by the nominal control law that maintains the state of the spacecraft within the control invariant set despite internal and external forces acting on the spacecraft; and executing, upon detecting the abnormal operation of the spacecraft, an abort control law associated with the control invariant set including a current state of the spacecraft, wherein at least some different abort control laws are associated with at least some different control invariant sets, and wherein the abort control law is jointly and interdependently determined for the corresponding control invariant set to produce abort control commands moving the spacecraft while avoiding the keep-away zone for any state within the corresponding control invariant set.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
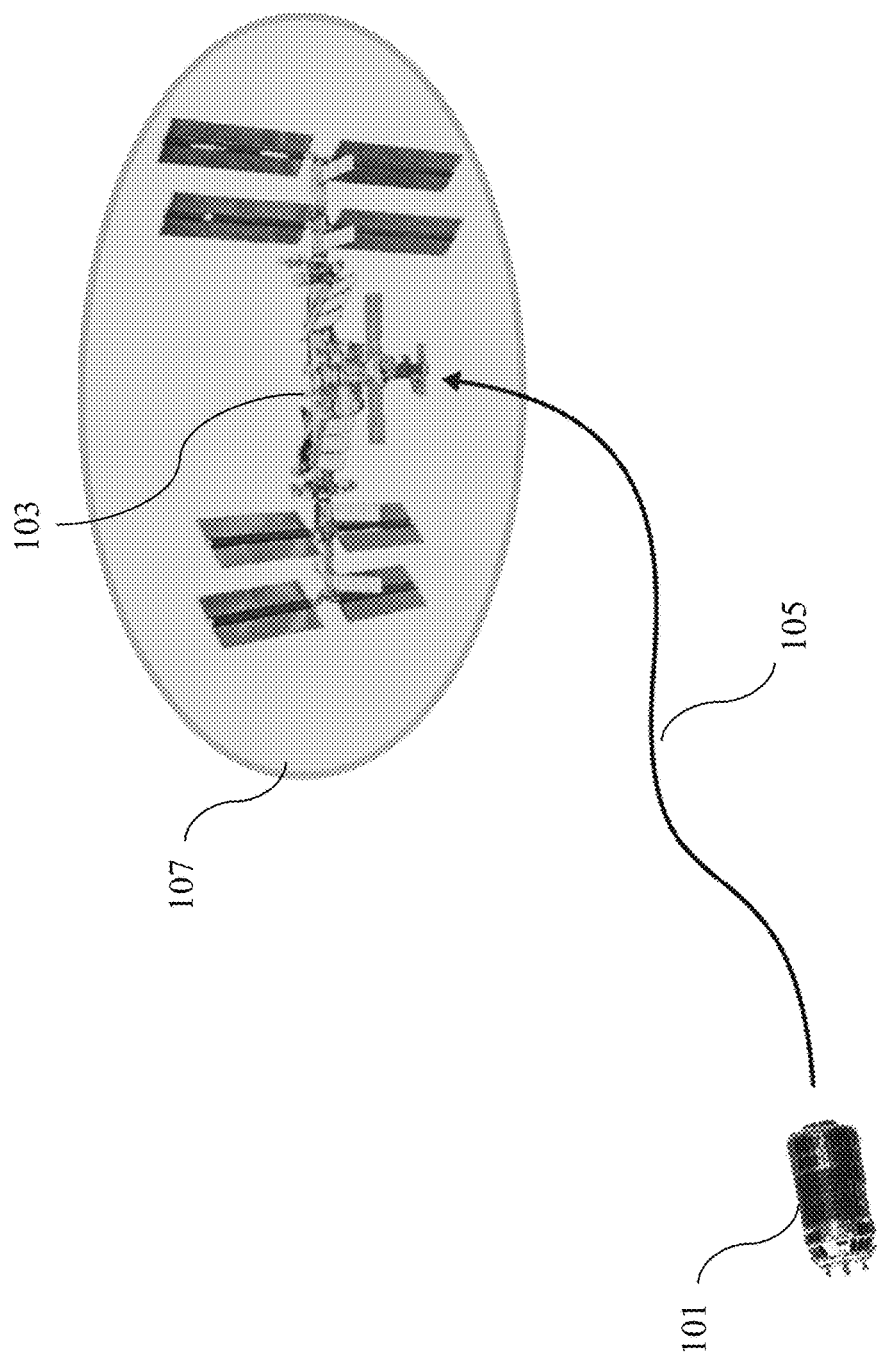
FIG. 1A illustrates a motion of a spacecraft in a multi-object celestial system, according to an embodiment of the present disclosure.

FIG. 1A illustrates a motion of a spacecraft 101 in a multi-object celestial system, according to an embodiment of the present disclosure. The spacecraft 101 may be configured to rendezvous with a target 103 by following a trajectory 105. The target 103 may be a spacecraft, a celestial body, an international space station, or orbital debris. For the purpose of explanation, the target is 103 is illustrated as the international space station. A keep-away zone 107 exists around the target 103. The keep-away zone 107 refers to a region which the spacecraft 101 must not enter without authorization. Additionally or alternatively, the keep-away zone 107 corresponds to a keep-away set, which is a collection of states including spacecraft positions and velocities that the spacecraft 101 must stay outside of.

It is an objective of some embodiments to control the motion of the spacecraft 101 while avoiding an unauthorized entry into the keep-away zone 107 during a normal and abnormal operation of the spacecraft 101. As used herein, the normal operation includes the spacecraft 101 moving towards the keep-away zone 107. The abnormal operation includes one or a combination of a failure to receive the authorization to enter the keep-away zone 107 and a failure of at least one component of the spacecraft 101, for example, thrusters.

To achieve such a control objective, some embodiments provide a controller for controlling the motion of the spacecraft 101 during the normal and abnormal operation of the spacecraft 101.

Figure 1B:
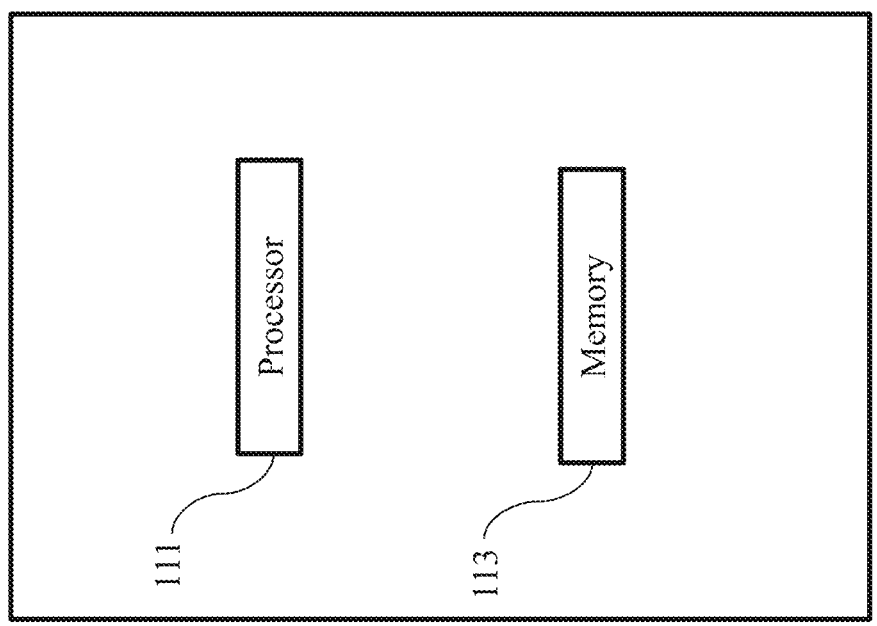
FIG. 1B shows a block diagram of a controller for controlling the motion of the spacecraft during normal and abnormal operation of the spacecraft, according to an embodiment of the present disclosure.

FIG. 1B shows a block diagram of a controller 109 for controlling the motion of the spacecraft 101 during the normal and abnormal operation of the spacecraft 101, according to an embodiment of the present disclosure. The controller 109 includes a processor 111 and a memory 113. The processor 111 may be a single core processor, a multi-core processor, a computing cluster, or any number of other configurations. The memory 113 may include random access memory (RAM), read only memory (ROM), flash memory, or any other suitable memory systems. Additionally, in some embodiments, the memory 113 may be implemented using a hard drive, an optical drive, a thumb drive, an array of drives, or any combinations thereof.

Some embodiments are based on recognition that achieving the aforesaid control objective (i.e., controlling the motion of the spacecraft 101 while avoiding an unauthorized entry into the keep-away zone 107 during a normal and abnormal operation of the spacecraft 101) is challenging because there are states of the spacecraft 101 in proximity of the keep-away zone 107 that may unavoidably lead the spacecraft 101 into the keep-away zone 107, even if the authorization to enter is rejected. The authorization to enter may be rejected based on any reason including a total or partial failure of propulsion of the spacecraft 101. As used herein, the state of the spacecraft 101 includes a location of the spacecraft 101 and at least one or a combination of a velocity and an acceleration of the spacecraft 101. Additionally, internal and external forces acting on the spacecraft 101 during its motion, such as inertia and force of gravity, may change the state of the spacecraft 101 to specific states that may lead the spacecraft 101 into the keep-away zone 107, regardless of any efforts that the spacecraft 101 may perform.

Some embodiments are based on the realization that this problem can be addressed by computing a union of a plurality of control invariant sets of values of the state of the spacecraft 101 that the state of the spacecraft 101 should be maintained within.

Figure 1C:
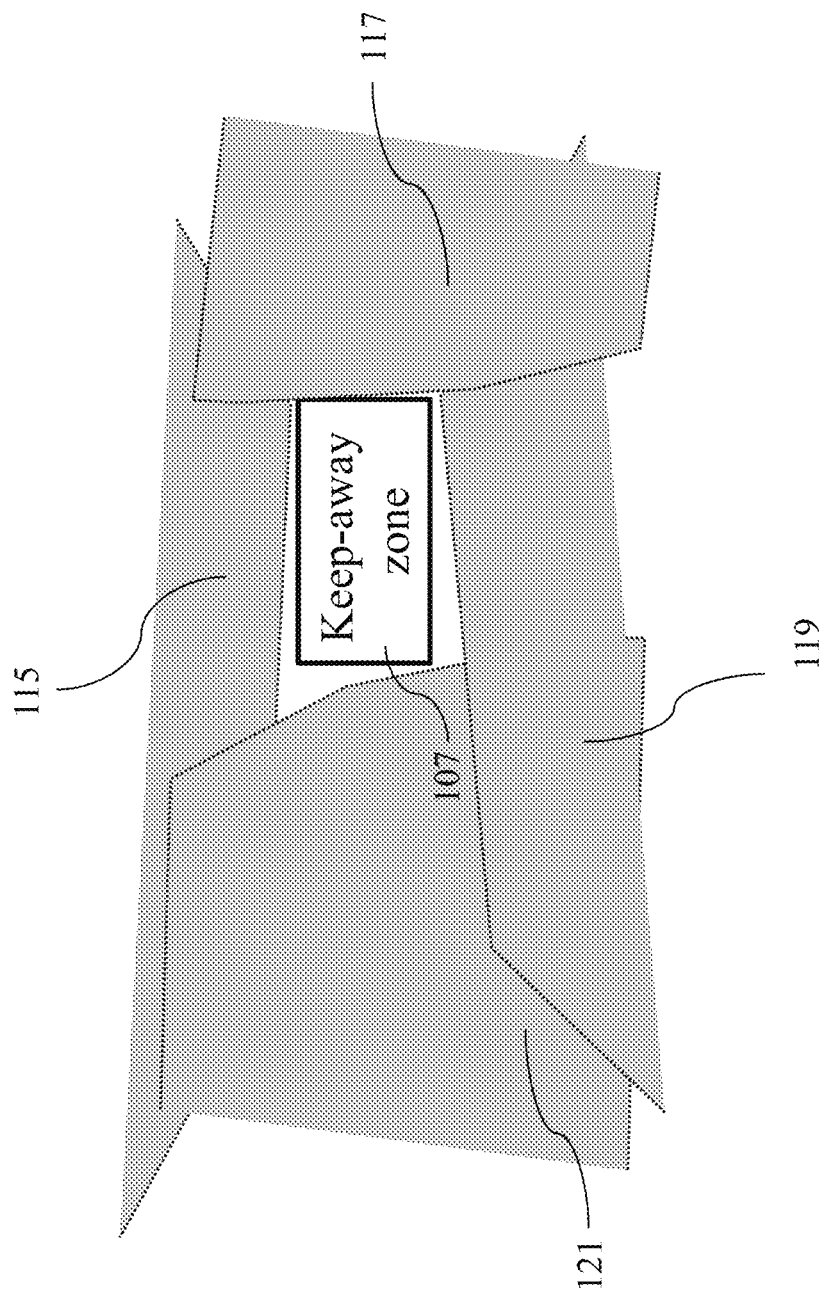
FIG. 1C shows a union of a plurality of control invariant sets of values of state of the spacecraft, according to an embodiment of the present disclosure.

FIG. 1C shows the union of the plurality of control invariant sets of the values of the state of the spacecraft 101, according to an embodiment of the present disclosure. Control invariant sets 115, 117, 119, and 121 form the union of the plurality of control invariant sets. In an embodiment, the union of the plurality of control invariant sets may partially enclose the keep-away zone 107. In some other embodiments, the union of the plurality of control invariant sets may completely enclose the keep-away zone 107 to allow the spacecraft 101 to approach the target 103. Each control invariant set is determined such that when the state of the spacecraft 101 is within a control invariant set (e.g., the control invariant set 121) there is a control command produced by a nominal control law that maintains the state of the spacecraft 101 within the control invariant set (the control invariant set 121) despite the internal and external forces acting on the spacecraft 101.

Therefore, during the normal operation of the spacecraft 101, when the state of the spacecraft 101 is within one of the control invariant sets 115, 117, 119, and 121, the state of the spacecraft 101 is controlled such that the spacecraft 101 is within the one of the control invariant sets 115, 117, 119, and 121, and does not enter the keep-away zone 107.

Further, to control the motion of the spacecraft 101 in an event of the abnormal operation, each control invariant set is determined such that there is an abort control law that produces abort control commands. The abort control commands safely abort the motion of the spacecraft 101 while avoiding the keep-away zone 107. For example, when the state of spacecraft is within the control invariant set 121 and there is a thruster failure (abnormal operation), the abort law corresponding to the control invariant set 121 produces the abort control commands that safely aborts the motion of the spacecraft 101 while avoiding the keep-away zone 107.

Some embodiments are based on recognition that it is computationally expensive to compute the control invariant sets 115, 117, 119, and 121, online, i.e., during real-time controlling of the spacecraft 101. To mitigate this problem, the control invariant sets 115, 117, 119, and 121 and the corresponding abort control laws are determined offline, i.e., in advance. Specifically, the abort control law is jointly and interdependently determined for the corresponding control invariant set to produce the abort control commands. The offline determined control invariant sets and the corresponding abort laws may be stored in the memory 113 of the controller 109.

To that end, during online control of the spacecraft 101 under the abnormal operation, the processor 111 receives a current state of the spacecraft 101. Further, the processor 111 selects a control invariant set that includes the current state of the spacecraft 101. The processor 101 executes the abort control law corresponding to the selected control invariant set. Hence, in different states in which the abnormal operation is detected, the controller 109 may use different predetermined abort control laws, thereby reducing the computational burden, and reducing latency of reaction when the abnormal operation is detected.

Figure 2:
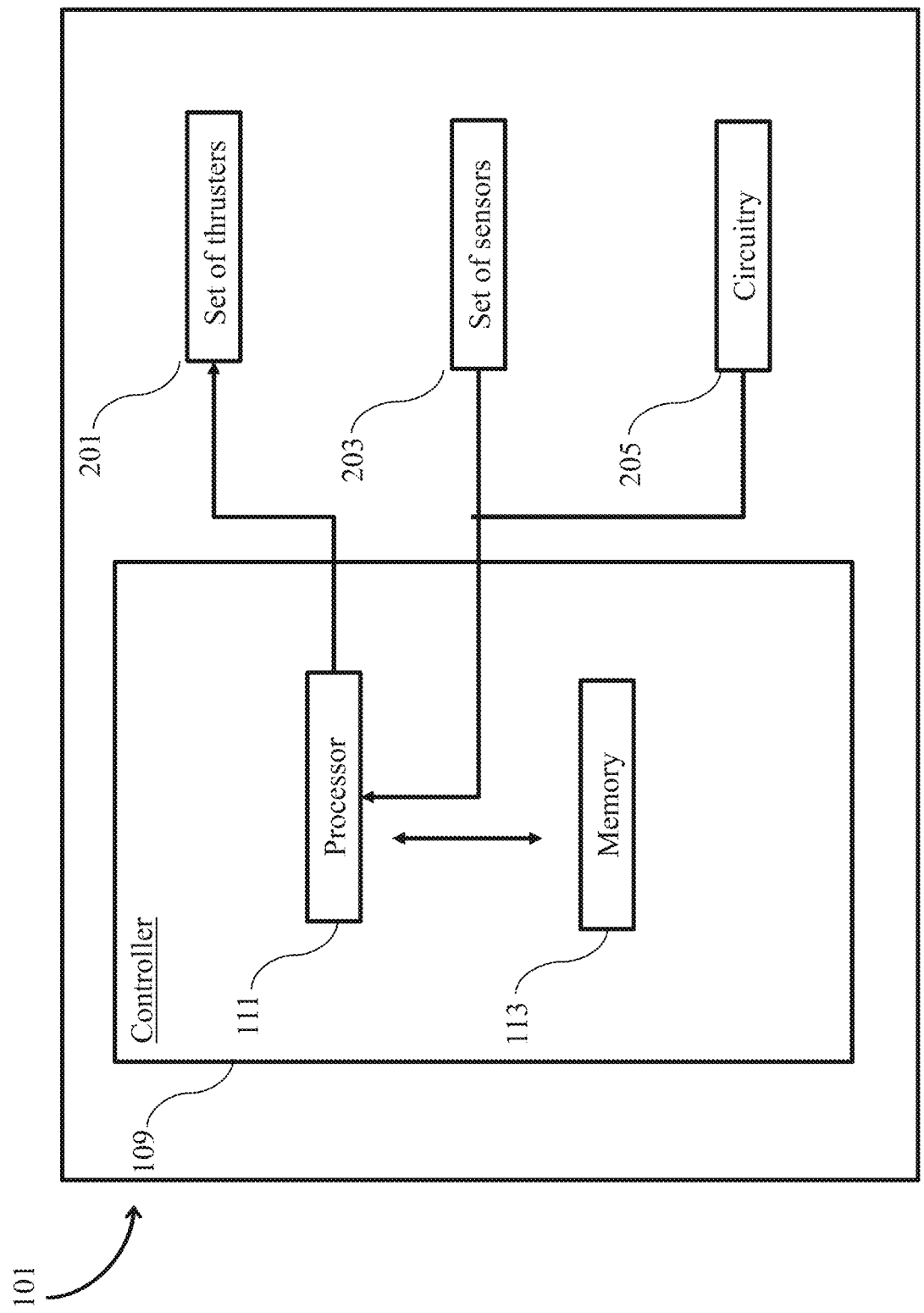
FIG. 2 shows a block diagram of the spacecraft including the controller and other components, according to an embodiment of the present disclosure.

According to an embodiment, the controller 109 may be embedded in the spacecraft 101. FIG. 2 shows a block diagram of the spacecraft 101 including the controller 109 and other components, according to an embodiment of the present disclosure. The spacecraft 101 includes the controller 109, a set of thrusters 201, a set of sensors 203, and a circuitry 205. The processor 111 may submit a sequence of control commands produced by the nominal and the abort control laws, i.e., the control commands and the abort control commands, to the set of thrusters 201. The set of thrusters 201 are configured to change the state of the spacecraft 101 according to the sequence of control commands produced by the nominal and the abort control laws. According to an embodiment, the set of thrusters 201 include eight thrusters, wherein each thruster is mounted in a manner aligned with a center of mass of the spacecraft 101, so that the thrusters produce forces to change the position of the spacecraft 101 while producing no torques to rotate the spacecraft 101.

The set of sensors 203 are configured to produce measurements indicative of the state of the spacecraft 101. The measurements indicative of the state of the spacecraft 101 are submitted to the processor 111. In an embodiment, the set of sensors 203 may include a velocity sensor configured to produce measurements indicative of the velocity of the spacecraft 101, and an acceleration sensor configured to produce measurements indicative of the acceleration of the spacecraft 101. The circuitry 205 is configured to detect the abnormal operation of the spacecraft 101. In an embodiment, the circuitry 205 may detect the abnormal operation based on off state of the set of thrusters 201. For example, due to a fault in the spacecraft 101, one or more thrusters of the set of thrusters 201 may turn into off state. Based on the off state of the one or more thrusters, the circuitry 205 detects the abnormal operation and communicates it to the processor 111.

Some embodiments are based on a recognition that the motion of the spacecraft 101 is subject to an unbounded stochastic uncertainty. The unbounded stochastic uncertainty includes a probabilistic distribution of process noise. The process noise may specify an actuation mismatch and/or unmodeled dynamics of the motion of the spacecraft 101. In addition to the process noise, the unbounded stochastic uncertainty may include a probabilistic distribution of measurement noise of an estimation of the state of the spacecraft. Since the motion of the spacecraft 101 is subject to the unbounded stochastic uncertainty, there is a need to avoid the unauthorized entry of the spacecraft 101 into the keep-away zone 107 with a prescribed safety likelihood in consideration of the unbounded stochastic uncertainty.

Some embodiments are based on understanding that it is possible to control the motion of the spacecraft 101 with the prescribed safety likelihood. For example, different methods enforcing the motion under the unbounded stochastic uncertainty include chance constraints, particle filtering, scenario optimization, and stochastic tube methods. To that end, it may be assumed that it is possible to control the motion of the spacecraft 101 within the union of the plurality of control invariant sets with the prescribed safety likelihood. However, such an assumption is based on a notion that each control invariant set is determined deterministically, i.e., without the unbounded stochastic uncertainty. However, such an assumption may be incorrect because if there is any uncertainty in the motion of the spacecraft 101 during its online control, the same or similar uncertainty exists during calculation of the control invariant sets.

To that end, some embodiments are based on the realization that each control invariant set should inner-approximate the values of the state of the spacecraft 101 to guarantee control invariance under the unbounded stochastic uncertainty. Moreover, such a guarantee should be with a likelihood of the unbounded stochastic uncertainty greater than the prescribed safety likelihood. This is because ultimate stochastic guarantee of the motion control is a function of a product of the likelihood of the control invariance under the unbounded stochastic uncertainty and a likelihood of a motion that satisfies constraints derived from the control invariant sets. Because of the unbounded stochastic uncertainty, all of these likelihoods are less than one and thus needs to be considered together to ensure the prescribed safety likelihood.

Therefore, each control invariant set inner-approximates the values of the state of the spacecraft 101 to guarantee the control invariance with a first likelihood of the unbounded stochastic uncertainty greater than the prescribed safety likelihood. The nominal control law is configured to produce a control command maintaining the state of the spacecraft 101 within the union of the control invariant sets with a second likelihood selected such that a product of the first likelihood and the second likelihood equals or greater than the prescribed safety likelihood.

The aforedescribed control problem may be expressed mathematically as below.

Spacecraft dynamics is assumed to be $$x_{t+1} = Ax_t + B(u_t + w_t)$$

with state $x_t$ including the spacecraft position, velocity, and other relevant information, input $u_t$ including net forces realized by the thrusters, actuation uncertainty $w_t$ which is a stochastic random vector modeling a mismatch in the actuation, and appropriate matrices A and B that describe an evolution of the spacecraft dynamics. The matrices A and B can be either obtained from existing models of the spacecraft relative motion including Clohessy-Wiltshire equations or from linearization of nonlinear models describing the spacecraft motion.

At each time step, it is assumed that a noisy measurement of the spacecraft state is available to the controller 109 in a form of $y_t = x_t + \gamma_t$ where $\gamma_t$ it is a measurement uncertainty which is a Gaussian random vector with known mean and covariance. Such a measurement model can be obtained by determining the state of the spacecraft 101 by using a probabilistic filter on the measurements of the set of sensors 203. The probabilistic filter includes one or a combination of a Kalman filter and a particle filter. Alternatively, such a measurement model can describe uncertainty in the state estimation available from any estimator that fuses information of the set of sensors 203 to reconstruct the spacecraft state.

To that end, the actuation uncertainty $w_t$ and the measurement uncertainty $\gamma_t$ are Gaussian random vectors with a known mean and covariance. The actuation uncertainty $w_t$ and the measurement uncertainty $\gamma_t$ describe the uncertainty in the actuation and the measurement via stochastic models.

The keep-away set is a polytope described via an intersection of a collection of halfspaces KeepOut=$\cap_i$KeepOut$_i$, where i is a finite index of the halfspace. Let sets $\varepsilon_{act}$, $\varepsilon_{meas}$ denote a bounded process noise set and a measurement noise set, respectively. The sets $\varepsilon_{act}$, $\varepsilon_{meas}$ are chosen a priori such that the likelihood of the actuation and measurement uncertainty lying in these sets is no smaller than $\alpha_{act}^*$, $\alpha_{meas}^*$ respectively, where M is a number of time steps for which safety must be guaranteed during an abort. For Gaussian uncertainties the sets $\varepsilon_{act}$, $\varepsilon_{meas}$ are ellipsoids.

The control invariant sets are defined as a union of sets $\mathcal{O}_0(\varepsilon_{act}, \varepsilon_{meas}, \chi\backslash \text{KeepOut}_i)$ over i for bounded uncertainty sets $\varepsilon_{act}$, $\varepsilon_{meas}$ on the actuation and measurement uncertainty and the keep-away set KeepOut. The union of sets $\mathcal{O}_0(\varepsilon_{act}, \varepsilon_{meas}, \chi\backslash \text{KeepOut}_i)$ are constructed such that whenever the current spacecraft state belongs to the set $\mathcal{O}_0(\varepsilon_{act}, \varepsilon_{meas}, \chi\backslash \text{KeepOut}_i)$ for some index i, the abort control commands can be computed to ensure that the spacecraft 101 stays outside the keep-away set KeepOut with a likelihood no smaller than $\beta = \alpha_{act}\alpha_{meas}$ over a horizon of M time steps.

According to an embodiment, the nominal control law steers the spacecraft 101 to the target 103 in the keep-away set, while ensuring that the spacecraft 101 stays within the control invariant sets and all necessary state and input constraints are satisfied by the nominal control law. An example of such a control law solves the following optimization problem at each time step, $$\min. \sum_{t \in \mathbb{N}_{[k+1, k+N]}} dist(\mu_{q k}, \text{KeepOut})^2 + \lambda \|U\|_2^2 \quad (1a)$$

$$\text{s.t. State } x_{qk} \text{ and measurement } y_{t|k} \text{ under } U \in \mathcal{U}^N, \quad (1b)$$

$$\mathbb{P}\{\forall t \in \mathbb{N}_{[k+1,k+N]}, x_{t|k} \notin \text{KeepOut}\} \geq \alpha_{nom}, \quad (1c)$$

$$\mathbb{P}\{y_{t|k} \in U_i O_0(\varepsilon_{net}, \varepsilon_{meas}, \mathcal{X}\backslash \text{KeepOut}_i)\} \geq \alpha_{out}, \quad (1d)$$

where $\alpha_{nom} \in (0, 1]$ and $\alpha_{out} \in (0, 1]$ are determined by a user based on spacecraft mission specifications.

Objective (1a) is a quadratic objective that minimizes a sum of squared distance of the spacecraft 100 to the keep-away set KeepOut over time as well as the energy expended by an open-loop control sequence U. Here, $\mu_{t|k}$ denotes a mean position of the spacecraft 101 at a future time t when starting from a time k. The objective (1a) thus is minimized when minimal control effort is utilized to steer the spacecraft 101 towards the keep-away set KeepOut.

Constraint (1b) results in a collection of linear equality constraints describing evolution of a mean and a covariance matrix of the spacecraft state and measurement. Some embodiments are based on a realization that due to the linearity of the spacecraft dynamics and Gaussianity of the actuation and measurement uncertainty, future states and measurements of the spacecraft 101 can be described as the Gaussian random vectors, with explicit descriptions of their mean and covariance.

Constraint (1c) requires that, for a finite horizon into the future, the normal operation of the spacecraft 101 should be such that the future states of the spacecraft 101 does not enter the keep-away set with a likelihood no smaller than $\alpha_{nom} \in (0, 1]$.

Constraint (1d) requires that, for the finite horizon into the future, the normal operation of the spacecraft 101 should be such that the future measurements of the spacecraft 101 stays within the control invariant sets with a likelihood no smaller than $\alpha_{nom} \in (0, 1]$. The constraints (1c) and (1d) are chance constraints.

The optimization problem (1) can be cast as a mixed-integer quadratic program using standard application of Boole's inequalities, Frechet's inequalities, and disjunctive programming, provided the sets KeepOut, $\mathcal{O}_0(\varepsilon_{act}, \varepsilon_{meas}, \chi\backslash \text{KeepOut}_i)$, and control constraints $\mathcal{U}$ are polytopes.

Alternatively, in some other embodiments, the optimization problem (1) can be cast as a convex quadratic program using and scheduling of the optional constraints in (1d), provided the sets KeepOut, $\mathcal{O}_0(\varepsilon_{act}, \varepsilon_{meas}, \chi\backslash \text{KeepOut}_i)$, and the control constraints $\mathcal{U}$ are polytopes.

Some embodiments are based on the realization that the nominal controller guarantees abort safety with a safety likelihood no smaller than the product of the first likelihood $\beta \in (0, 1]$ and the second likelihood $\alpha_{out} \in (0, 1]$. The first likelihood $\beta$ characterizes the computation of the robust controlled invariant sets $\mathcal{O}_0(\varepsilon_{act}, \varepsilon_{meas}, \chi\backslash \text{KeepOut}_i)$ where $\beta = \alpha_{act}\alpha_{meas}$ and the sets $\varepsilon_{act}$, $\varepsilon_{meas}$ are chosen such that the likelihood of the actuation and measurement uncertainty lying in these sets is no smaller than $\alpha_{act}^*$, $\alpha_{meas}^*$ respectively, where M is a number of time steps for which safety must be guaranteed during an abort. Consequently, $\beta$ is the minimal likelihood with which an off-nominal controller exists such that the spacecraft stays within the set $\chi\backslash \text{KeepOut}_i$ (or stay away from the keep-away set KeepOut) in the event of an abnormal operation. The second likelihood $\alpha_{out}$ is the minimal likelihood with the nominal control steers the spacecraft within the stochastic reachable set for the ability to safely abort in the event of a partial actuation failure (see (1d)).

Some embodiments are based on the realization that the nominal controller that solves (1) guarantees overall safety of the trajectory of at least $\alpha$, irrespective of the occurrence of fault, provided $\alpha_{nom} + \beta\alpha_{out} \geq 1 + \alpha$. Here, $\alpha_{nom} \in (0, 1]$ correspond to the minimal likelihood with which the nominal controller steers the spacecraft away from the keep-away set (see (1c)).

Some embodiments use various techniques to compute the control invariant sets for the dynamics of the spacecraft 101 under the unbounded stochastic uncertainty (i.e., Gaussian uncertainty). For example, one embodiment uses stochastic reachable sets to determine the control invariant sets. This embodiment is advantageous when the control invariant set to stay within is convex but can be suboptimal when the uncertainties have probability densities with fat tails. When the uncertainties have probability density with fat tails, an estimated uncertainty range for computation of the control invariant set becomes larger, leading to a severe reduction in a volume of the computed control invariant set. Since the control invariant set restricts the states admissible for the normal operation, it is desirable to have large control invariant sets. For the problems of interest, the uncertainties have thin tails since they are Gaussian uncertainties.

Each stochastic reachable set used to determine the control invariant set inner-approximates the values of the state of the spacecraft 101 to guarantee the control invariance. In an embodiment, the inner-approximation of the stochastic reachable set is obtained as a union of stochastic reachable sets defined for each convex component of a complement of the keep-out set. An inner approximation of the stochastic reachable set is described below with reference to FIGS. 3A, 3B, and 3C.

Figure 3A:
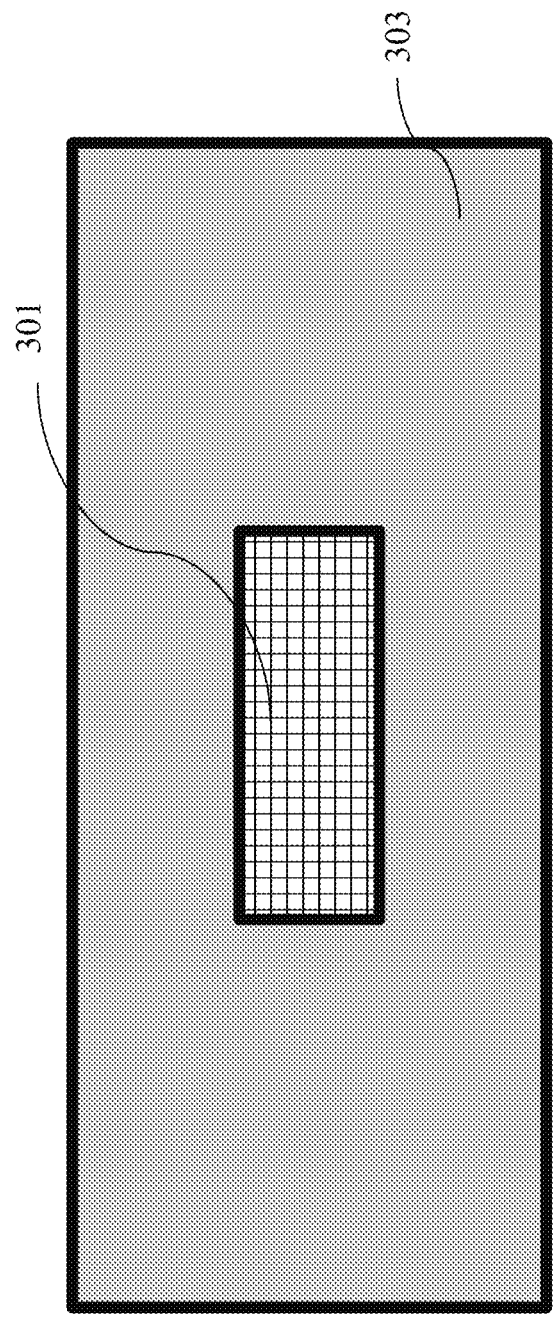
FIG. 3A shows a keep-away set and its complement, according to an embodiment of the present disclosure.

FIG. 3A shows a keep-away set 301 and its complement 303, according to an embodiment of the present disclosure.

Figure 3B:
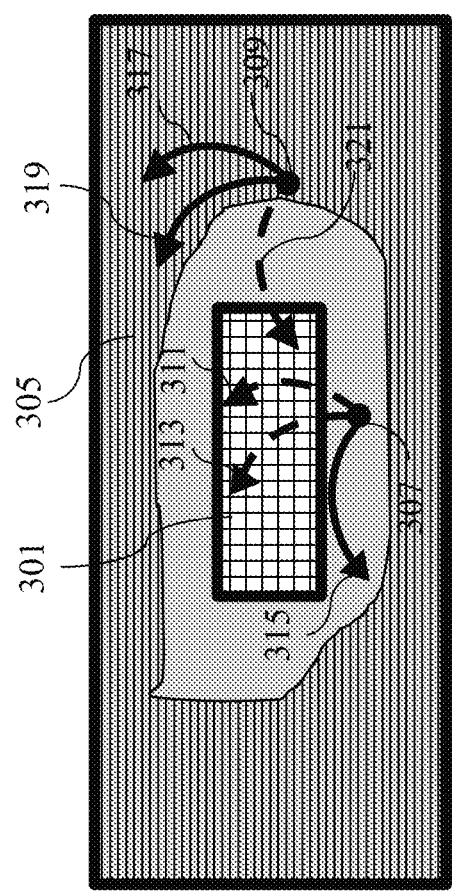
FIG. 3B illustrates a stochastic reachable set, according to an embodiment of the present disclosure.

FIG. 3B illustrates a stochastic reachable set 305, according to an embodiment of the present disclosure. The stochastic reachable set 305 includes all states from which the controller 109 can maintain the spacecraft 101 safe (i.e., maintain the spacecraft 101 outside of the keep-away set 301) up to a specified likelihood despite the unbounded stochastic uncertainty. For an initial state 307, trajectories 311, 313, and 315 may be stochastic future state trajectories. For an initial state 309, trajectories 317, 319, and 321 may be the stochastic future state trajectories. Since the spacecraft 101 is required to stay outside the keep-away set 301, the trajectories 311, 313, and 321 are unsafe, while the trajectories 315, 317, and 319 are safe. In other words, the controller 109 can keep the spacecraft 101 starting from the initial state 309 safe with two-thirds likelihood, and the spacecraft 101 starting from the initial state 307 safe with one-third likelihood. Consequently, the set 305 (shown with horizontal pattern fill) is the stochastic reachable set corresponding to a safety likelihood of two-third. The stochastic reachable set 305 therefore includes the initial state 309, but not the initial state 307.

Figure 3C:
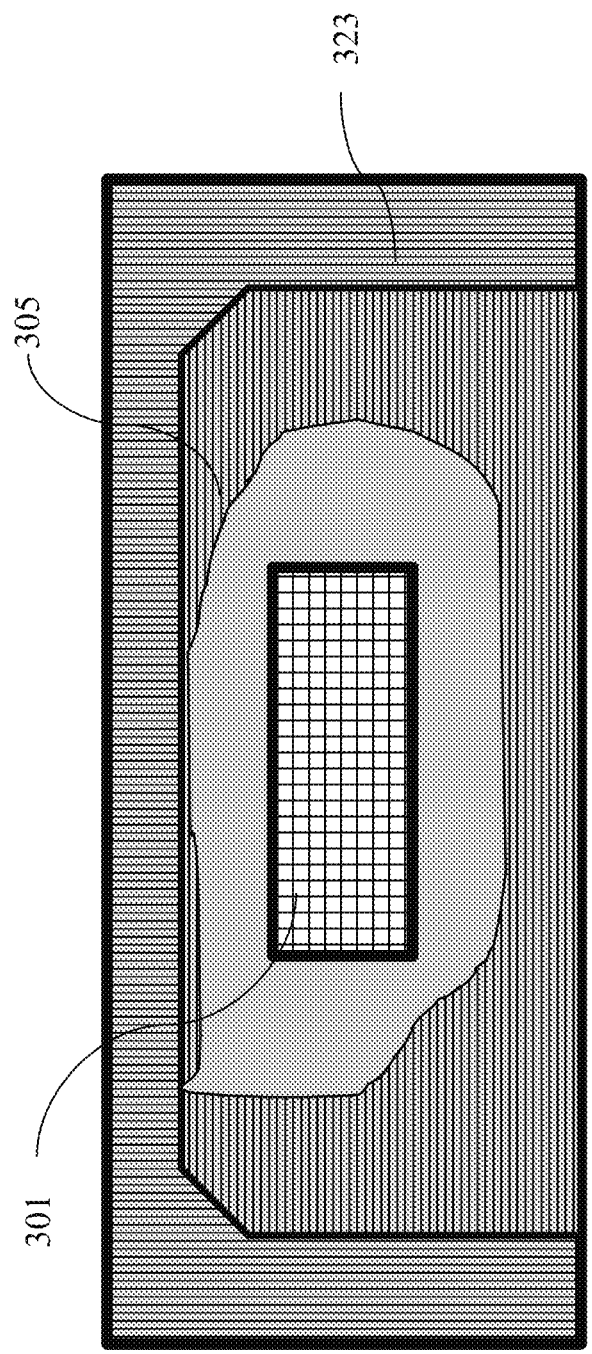
FIG. 3C illustrates an inner-approximation of the stochastic reachable set, according to an embodiment of the present disclosure.

FIG. 3C illustrates an inner-approximation of the stochastic reachable set, according to an embodiment of the present disclosure. A set 323 (shown with vertical pattern fill) is an inner-approximation of a stochastic reachable set 305 (shown with horizontal pattern fill). Any state that lies in the set 323 also lies in the stochastic reachable set 305. It may be observed from FIG. 3C that neither the set 323 nor the stochastic reachable set 305 covers the entire complement of the keep-away set 301 (shown in grey without pattern fill).

According to an embodiment, the inner approximation of the stochastic reachable set may correspond to a control invariant subset. For any state of the spacecraft 101 within the control invariant subset, there exists a control command maintaining the state of the spacecraft 101 within the control invariant subset for known or admissible future states of a nominal trajectory. An example control invariant subset is described below with reference to FIG. 4.

Figure 4:
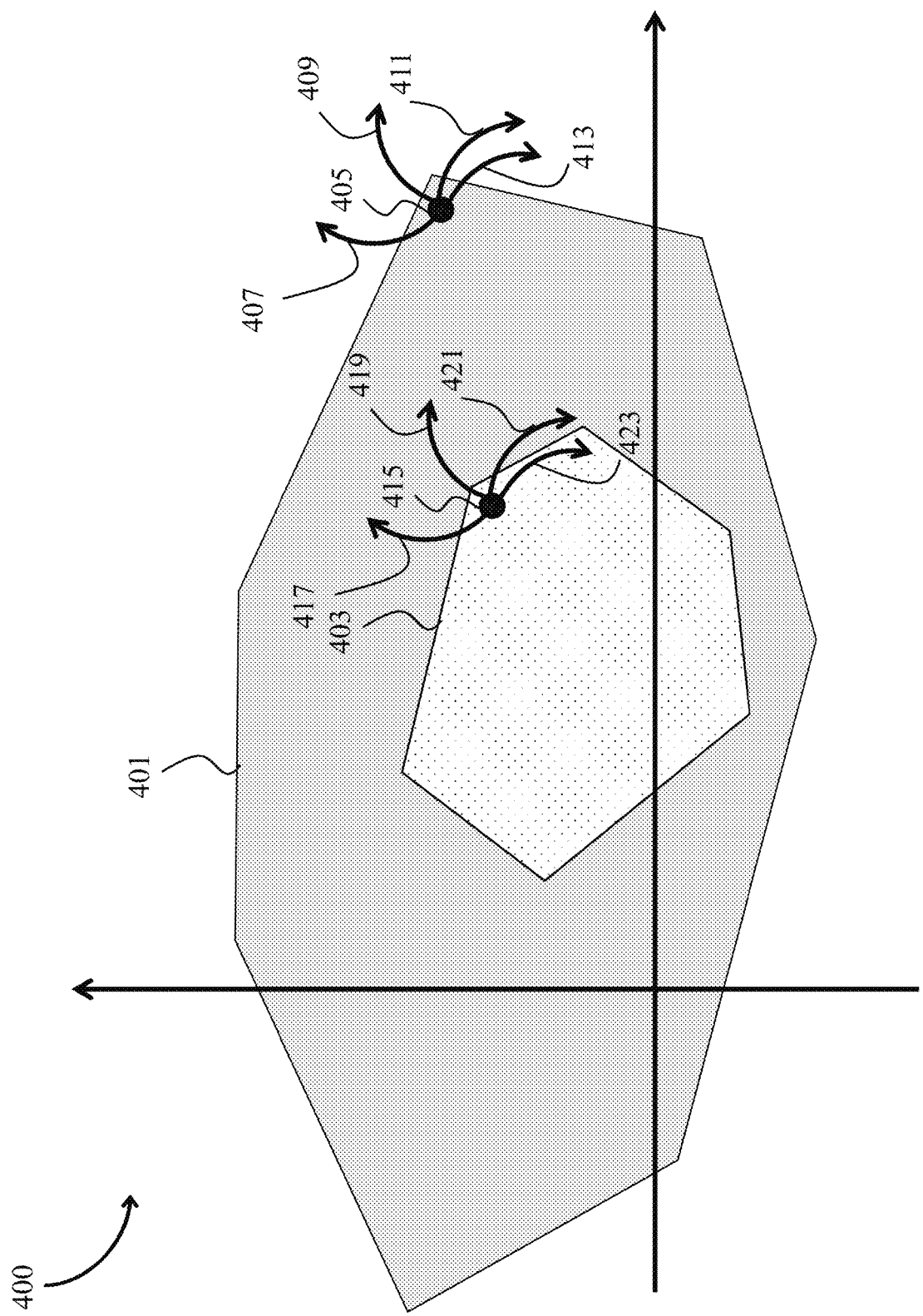
FIG. 4 shows an example of a two-dimensional projection of a control invariant set and a control-invariant subset, according to an embodiment of the present disclosure.

FIG. 4 shows an example of a two-dimensional projection 400 of a control-invariant set 403 corresponding to a constraint set 401, according to an embodiment of the present disclosure. In an embodiment, the constraint set 401 may be a multi-dimensional polytope determined by hyperplanes, which are represented by linear inequalities, along multiple dimensions corresponding to the constraints on the motion of the spacecraft 101. The constraint set 401 may encode the states of the spacecraft 101 that are safe. Any state of the spacecraft 101 within the control invariant set 403, there exists a control command maintaining the state of the spacecraft 101 within the control invariant set 403 for the known or the admissible future states of the nominal trajectory. For example, for any state of the spacecraft 101 such as a state 415 within the control invariant subset 403 and within all possible control inputs 417-423 that the controller 109 can execute, there is at least one control command 423 that maintains the state of the spacecraft 101 within the control invariant subset 403. On the other hand, a state 405 can be feasible for one iteration, but all control commands 407-413 that the controller 109 is allowed to take during the next iteration can bring the state of the spacecraft 101 outside of the constraint set 401.

Some embodiments are based on a realization that the control invariant sets can be computed by leveraging robust controlled invariant sets. The robust controlled invariant sets determine a set of states from which safety can be maintained despite bounded, non-stochastic uncertainties.

Figure 5:
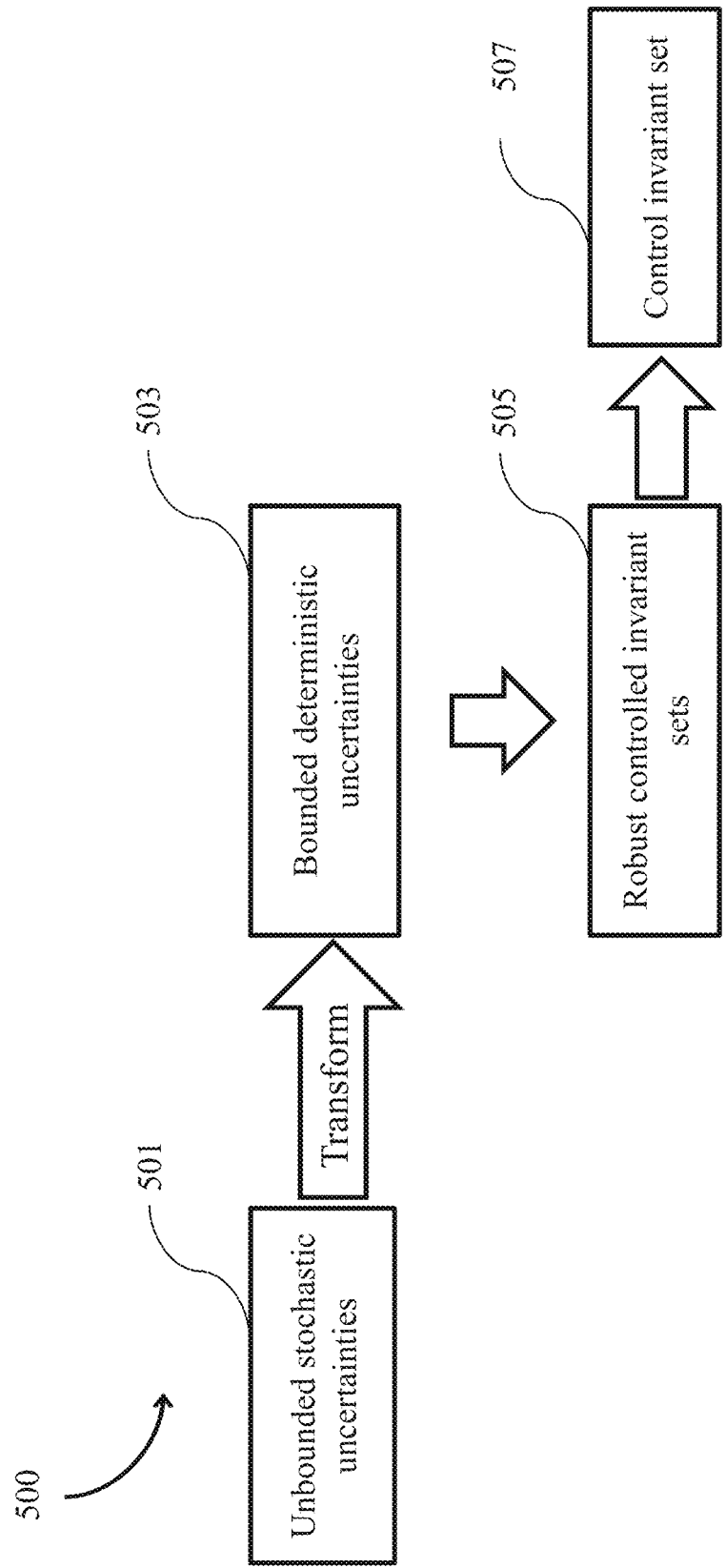
FIG. 5 shows a schematic for determining the control invariant set by leveraging a robust controlled invariant set, according to an embodiment of the present disclosure.

FIG. 5 shows a schematic 500 for determining the control invariant set by leveraging the robust controlled invariant set, according to an embodiment of the present disclosure. Various computational algorithms can be used for computing the robust controlled invariant sets. However, these algorithms are not directly applicable to the problem with the presence of unbounded, stochastic uncertainties 402 including the probabilistic distribution of the process and/or the measurement noise. This is because the computational algorithms are applicable to a problem with presence of bounded, deterministic uncertainties.

To mitigate this problem, the unbounded stochastic uncertainties 501 are transformed into bounded deterministic uncertainties 503 with a predefined likelihood specifying a range of values on the unbounded stochastic uncertainties 501. The transformation of block 501 to 503 by converting the unbounded stochastic uncertainty in actuation and measurement to non-stochastic bounded uncertainties that lie in the sets $\varepsilon_{act}$, $\varepsilon_{meas}$ are chosen such that the likelihood of the actuation and measurement uncertainty lying in these sets is no smaller than $$\alpha_{act}^{\frac{1}{N}}, \alpha_{meas}^{\frac{1}{N}}$$

respectively, where M is a number of time steps for which safety must be guaranteed during an abort and $\alpha_{act}$, $\alpha_{meas}$ are selected such that the first likelihood $\beta = \alpha_{act}\alpha_{meas}$. Next, the computational algorithms can be used to compute the robust controlled invariant set 505. Further, based on the robust controlled invariant sets 505, control invariant sets 507 are determined. Specifically, in an embodiment, the inner-approximation of the stochastic reachable set can be determined based on the robust controlled invariant sets 505. The determination of the inner-approximation of the stochastic reachable set, based on the robust controlled invariant sets 505, is described below with reference to FIG. 6.

Figure 6A:
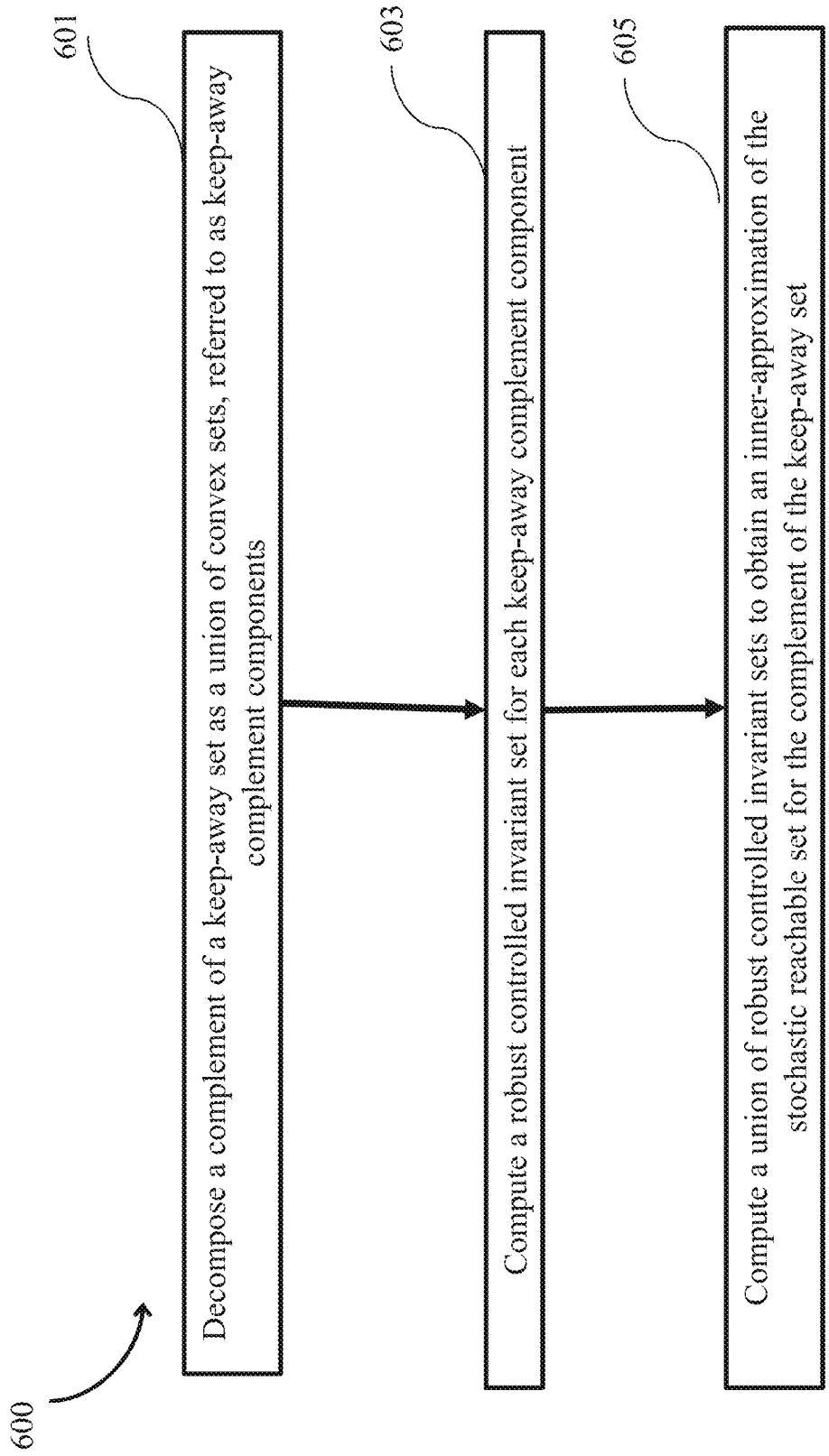
FIG. 6A shows a flow diagram of a method for computing an inner-approximation of a stochastic reachable set, based on the robust controlled invariant set, according to an embodiment of the present disclosure.

FIG. 6A shows a block diagram of a method 600 for computing the inner-approximation of the stochastic reachable set, based on the robust controlled invariant sets, according to an embodiment of the present disclosure. At block 601, the method 600 includes decomposing a complement of a keep-away set (e.g., the complement 303 of the keep-away set 301 as shown in FIG. 3A) as a union of convex sets.

Figure 6B:
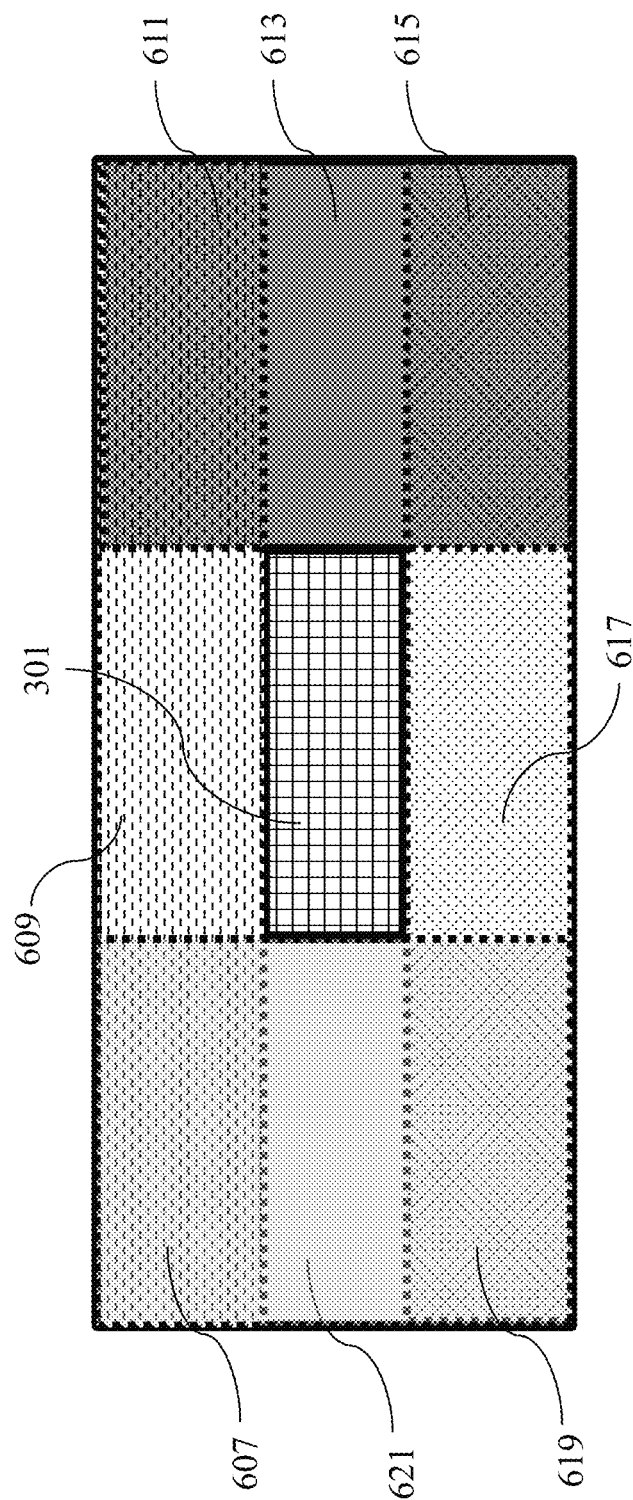
FIG. 6B shows a complement of a keep-away set decomposed as a union of convex sets, according to an embodiment of the present disclosure.
Figure 6C:
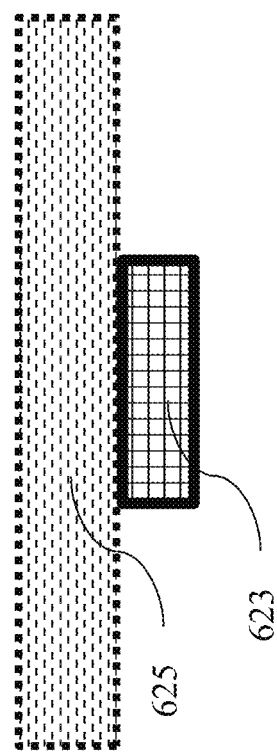
FIGS. 6C, 6D, 6E and 6F collectively show convex halfspaces that together define the complement of the keep-away set, according to an embodiment of the present disclosure.
Figure 6D:
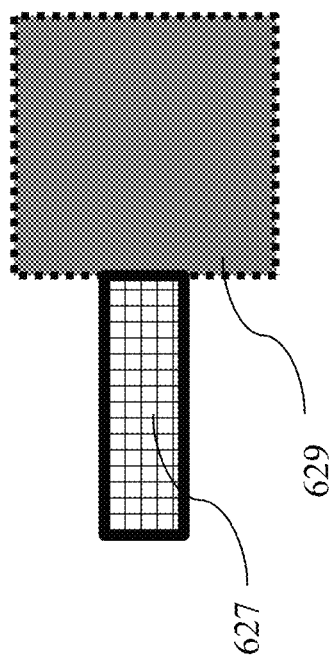
Figure 6E:
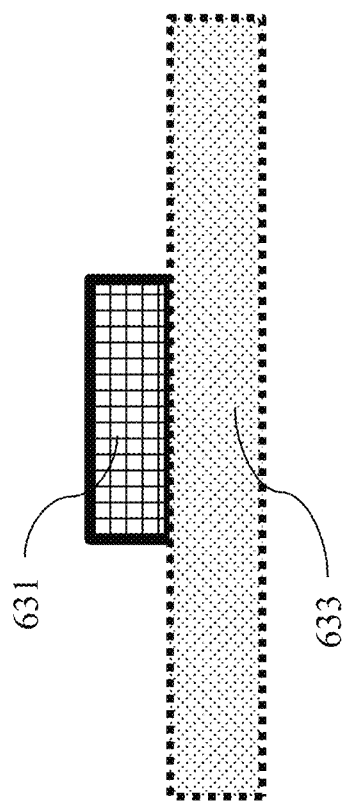
Figure 6F:
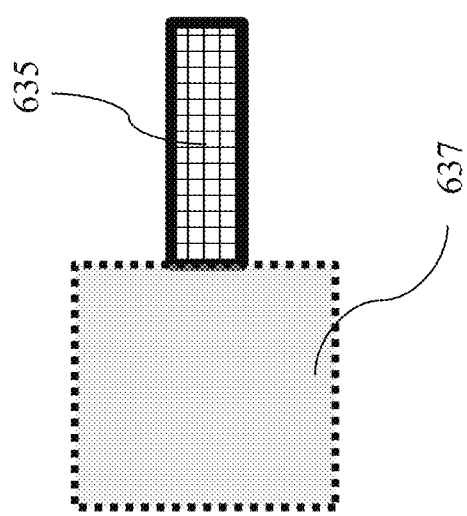

FIG. 6B shows the complement of the keep-away set 301 decomposed as the union of convex sets, according to an embodiment of the present disclosure. Convex sets 607-621 form the union of convex sets. Specifically, the keep-away set 301 is polytope and the complement of the keep-away set 301 can be expressed as a union of halfspaces. Each of such halfspaces are convex.

FIGS. 6C-6F collectively show convex halfspaces that together define the complement of the keep-away set 301. Sets 623, 627, 631, and 635 are reproductions of the keep-away set 301. A set 625 includes sets 607, 609, and 611, and a set 629 includes sets 611, 613, and 615. A set 633 includes sets 615, 617, and 619, and a set 637 includes sets 619, 621, and 607. The sets 607-621, which are convex, are referred to as keep-away complement components.

Referring back to FIG. 6A, at block 603, the method 600 further includes computing a robust controlled invariant set for each keep-away complement component. The robust controlled invariant sets are computed for the dynamics of the spacecraft 101 under bounded uncertainty in the actuation and the measurement lying in $\varepsilon_{act}$, $\varepsilon_{meas}$. In an embodiment, the computation of the robust controlled invariant sets for any convex set S is done via a recursion backwards-in-time for k={0, 1, ..., M−1} initialized with $\mathcal{O}_M(\varepsilon_{act}, \varepsilon_{meas}, \mathcal{S})=\mathcal{S}\ominus\varepsilon_{meas}$, as given below $$\mathcal{F}_k(\varepsilon_{act},\varepsilon_{meas},\mathcal{S})=\mathcal{O}_{k+1}(\varepsilon_{act},\varepsilon_{meas},\mathcal{S})\ominus(-\varepsilon_{meas})\ominus (B\varepsilon_{act})\ominus(-A\varepsilon_{meas}) \quad (2a)$$

$$\mathcal{O}_k(\varepsilon_{act},\varepsilon_{meas},\mathcal{S})=(\mathcal{S}\ominus(-\varepsilon_{meas}))\cap\{z|Az\in\mathcal{F}_k(\varepsilon_{act},\varepsilon_{meas},\mathcal{S})\oplus(-B\mathcal{V})\}. \quad (2b)$$

In equation (2a) and (2b), computational geometry operations $\oplus$, $\ominus$ refer to the Minkowski sum and difference operations, and $\mathcal{S}=\chi\backslash\text{KeepOut}_i$ is selected for every index i.

At block 605, the method 600 further includes computing a union of the robust controlled invariant sets to obtain the inner-approximation of the stochastic reachable set for the complement of the keep-away set, one for each index i. The inner-approximate guarantees the control invariance with the first likelihood of the unbounded stochastic uncertainty, over the horizon of M time steps. In other words, there exists an abort control law that that can steer the spacecraft 101 away from the keep-away set with the first likelihood for M time steps into the future, in the event of the abnormal operation.

In an embodiment, the robust control invariant set and the corresponding abort control law are determined jointly and interdependently using a single computation of robust control invariant set. The computation of the robust control invariant set automatically generates a set of control actions for each state that maintains the spacecraft 101 within the robust control invariant set. The set of control actions are characterized by the spacecraft dynamics, the control constraints, and the robust control set. The abort control law thus becomes selecting a control action from the set of control actions at each time step.

According to an embodiment, the abort control law to be applied in the event of the abnormal operation at time T is given by the following set-valued map defined for t=T, T+1, ..., T+M $$\mathcal{V}_{t,eff}=\{u\in\mathcal{V}\,|Ay_{t+T|T}+Bu\in(\mathcal{O}_{t+1}(\varepsilon_{act},\varepsilon_{meas},\chi\backslash\text{KeepOut}_i)\ominus(-\varepsilon_{meas})\ominus(B\varepsilon_{act})\ominus(-A\varepsilon_{meas}))\} \quad (3)$$

Equation (3) defines an admissible set $\mathcal{V}_{t,eff}$ of abort control commands to be applied at time t within a limited available actuation $\mathcal{V}$, a subset of actuation available under normal operation $\mathcal{U}$, such that the spacecraft 101 can be steered away from the keep-away set with likelihood no smaller than the first likelihood $\beta=\alpha_{act}\alpha_{meas}$. By construction, the set $\mathcal{V}_{t,eff}$ is a polytope.

Further, the nominal control law, which is applied during the normal operation, steers the spacecraft 101 to the target 103 in the keep-away set, while ensuring that the spacecraft 101 stays within the control invariant sets and all the necessary state and input constraints are satisfied by the nominal control law. An example of such a nominal control law solves the optimization problem given by equation (1). In an embodiment, the nominal control law is designed using a model predictive controller (MPC). The MPC is based on an iterative, finite horizon optimization of a model of the dynamics of the spacecraft 101, a set of objectives of the motion of the spacecraft 101, and constraints on spacecraft propulsion system and motion. The MPC can anticipate future events to take appropriate control actions. According to an embodiment, the MPC may estimate a sequence of control steps over a prediction horizon acting on the spacecraft 101 under the effect of internal and external forces.

According to an embodiment, the nominal control law is subject to the chance constraints to ensure that the spacecraft 101 satisfies state and input constraints arising from rendezvous problem, and the spacecraft stays within the control invariant sets with a specified likelihood. For example, the nominal control law is subject to the chance constraints (1c) and (1d). The chance constraint (1c) requires that, for a finite horizon into the future, the normal operation of the spacecraft 101 should be such that the future states of the spacecraft 101 does not enter the keep-away set with the likelihood no smaller than $\alpha_{nom}\in(0, 1]$. The chance constraint (1d) requires that, for the finite horizon into the future, the normal operation of the spacecraft 101 should be such that the future measurements of the spacecraft 101 stays within the control invariant sets with the likelihood no smaller than $\alpha_{out}\in(0, 1]$. Additionally, the chance constraints may include an actuation constraint that describe thruster limits or temporal restrictions on the thrusters.

Some embodiments are based on a recognition that enforcement of the chance constraints (1c) and (1d) may not be tractable. To that end, some embodiments aim to provide a conservative but tractable enforcement of the chance constraints (1c) and (1d). Some embodiments are based on the realization that, to conservatively enforce the chance constraints (1c) and (1d), the chance constraints (1c) and (1d) can be reformulated as a collection of mixed-integer linear constraints that conservatively enforces the chance constraints (1c) and (1d). In an embodiment, the chance constraints (1c) and (1d) can be reformulated as the collection of mixed-integer linear constraints, based on Boole's inequality, quantile reformulation, and disjunctive programming. The reformulation of the chance constraints (1c) and (1d) is explained below with reference to FIGS. 7A and 7B, respectively.

Figure 7A:
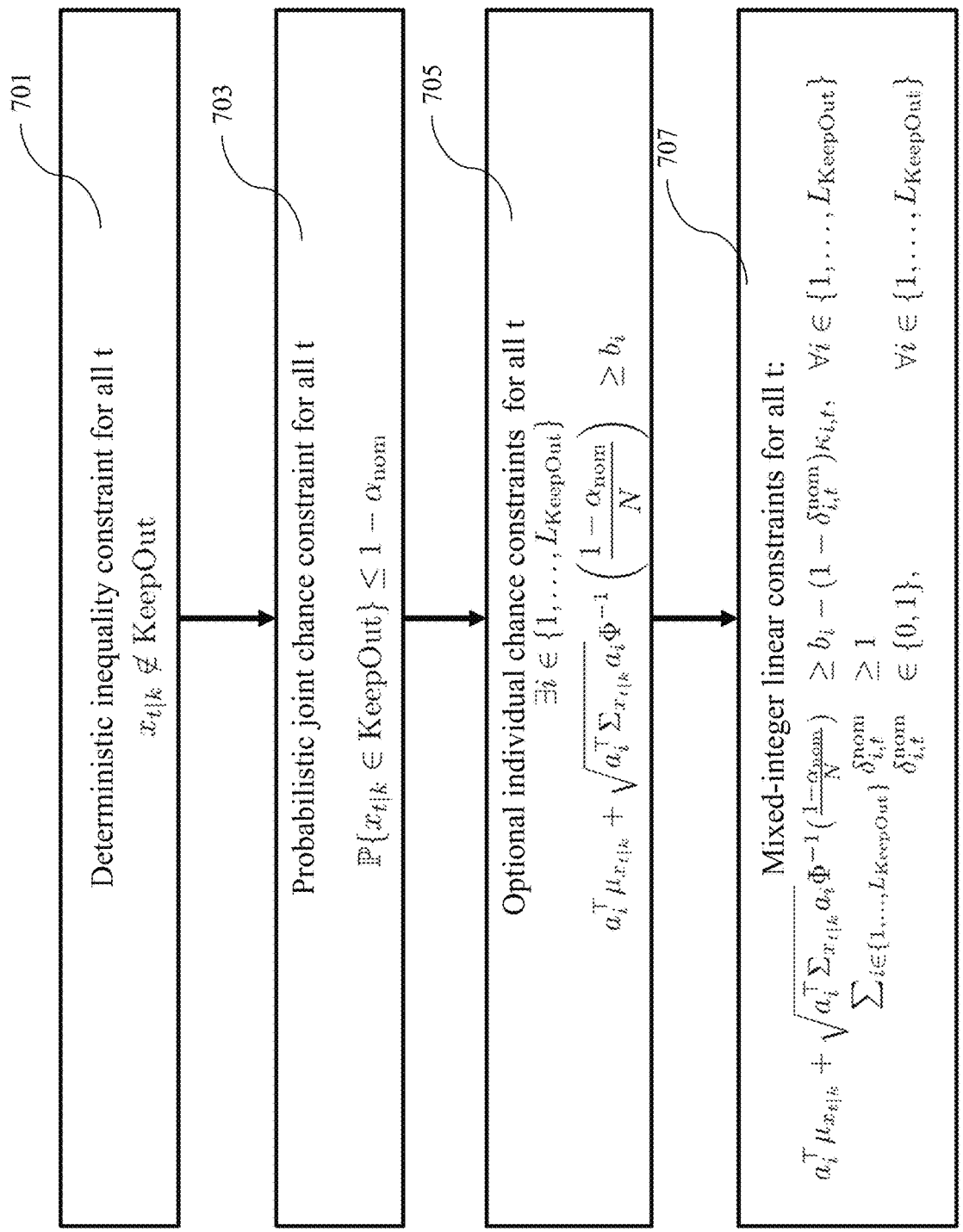
FIG. 7A shows a block diagram for reformulation of a chance constraint requiring future nominal trajectory states to stay outside the keep-away set, according to an embodiment of the present disclosure.

FIG. 7A shows a block diagram for reformulation of the chance constraint (1c) which requires future nominal trajectory states to stay outside the keep-away set, according to an embodiment of the present disclosure. At block 701, a desired behavior of the future nominal trajectory states to stay outside the keep-away set is given as $x_{t|k}\notin\text{KeepOut}$, which is a deterministic inequality constraint for all t.

At block 703, a probabilistic joint chance constraint is obtained by encoding the desired behavior. The probabilistic joint chance constraint may be given as $$\mathbb{P}\{x_{t|k}\in\text{KeepOut}\}\leq 1-\alpha_{nom}.$$

The probabilistic joint chance constraint bounds a probability of undesired behavior with a small probability.

At block 705, optional individual chance constraints are obtained by utilizing simple probability theory and quantile reformulation of Gaussian chance constraints. The optional individual chance constraints may be given as $$\exists\, i\in\{1, ..., L_{KeepOut}\}$$

$$a_i^T\mu_{x_{t|k}}+\sqrt{a_i^T\Sigma_{x_{t|k}}a_i}\,\Phi^{-1}\left(\frac{1-\alpha_{nom}}{N}\right)\geq b_i.$$

At block 707, the mixed-integer liner constraints are obtained based on constraint tightening and the disjunctive programming. The mixed-integer liner constraints may be given as $$a_i^T \mu_{x_{t|k}} + \sqrt{a_i^T \Sigma_{x_{t|k}} a_i} \, \Phi^{-1}\left(\frac{1-\alpha_{nom}}{N}\right) \geq b_i - (1-\delta_{i,t}^{nom})\mathcal{K}_{i,t}, \quad \forall i \in \{1, \ldots, L_{KeepOut}\} \quad (4)$$

$$\Sigma_{i \in \{1, \ldots, L_{KeepOut}\}} \delta_{i,t}^{nom} \geq 1$$

$$\delta_{i,t}^{nom} \in \{0, 1\}, \quad \forall i \in \{1, \ldots, L_{KeepOut}\}$$

Here, $\mathcal{K}_{i,t}$ is a sufficiently large value associated with big-M formulation of the disjunctive programming. The mixed-integer liner constraints (4) can be used instead of the chance constraint (1c).

Figure 7B:
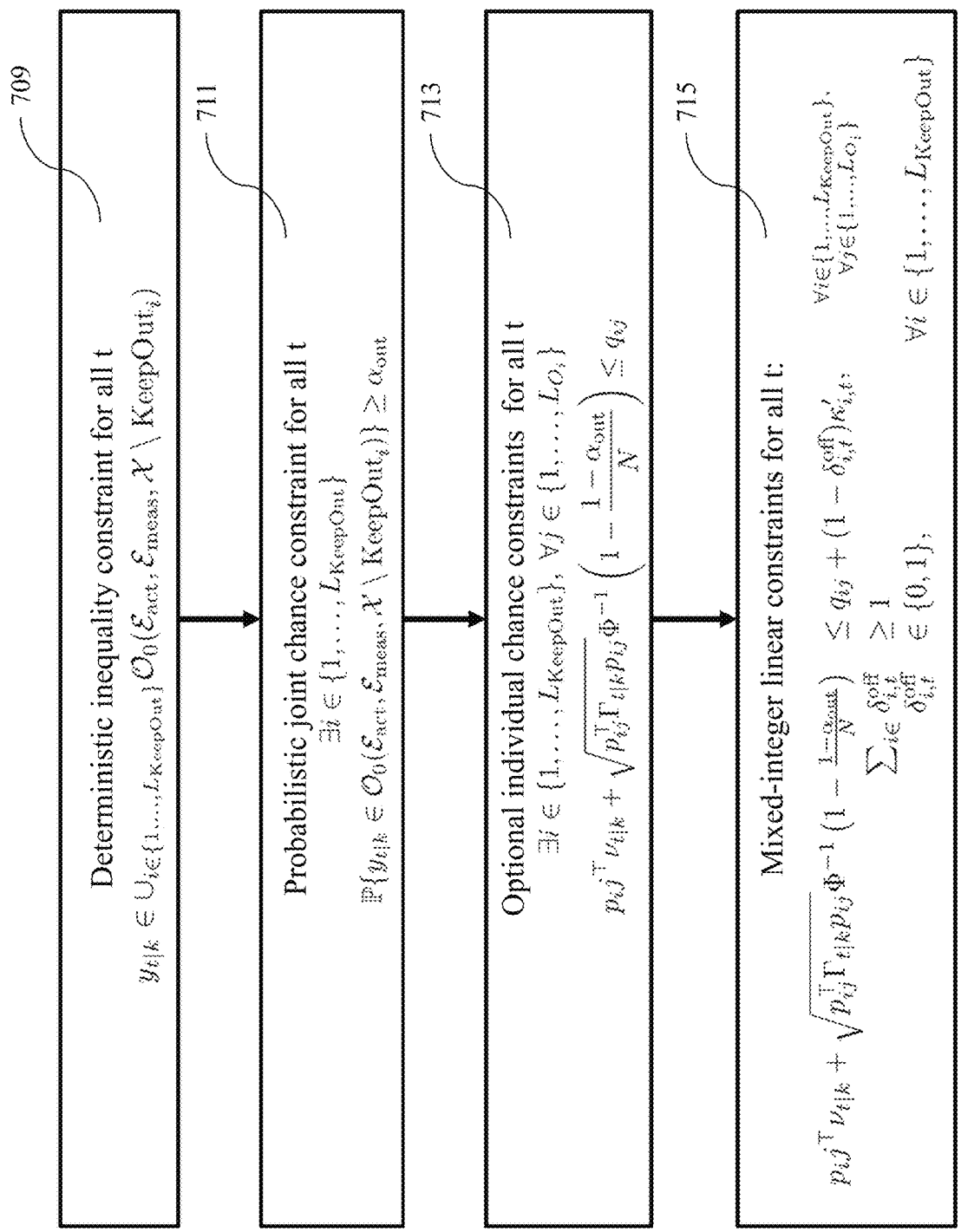
FIG. 7B shows a block diagram for reformulation of a chance constraint requiring future measurements of the spacecraft to stay within the control invariant sets, according to an embodiment of the present disclosure.

FIG. 7B shows a block diagram for reformulation of the chance constraint (1d) which requires the future measurements of the spacecraft 101 to stay within the control invariant sets, according to an embodiment of the present disclosure. At block 709, a desired behavior of the future measurements of the spacecraft 101 to stay within the control invariant sets is given as $\mathcal{Y}_{t|k} \in \cup_{i \in \{1, \ldots, L_{KeepOut}\}} \mathcal{O}_0(\varepsilon_{act}, \varepsilon_{meas}, \chi \backslash KeepOut_i)$, which is a deterministic inequality constraint for all t.

At block 711, a probabilistic joint chance constraint is obtained by encoding the desired behavior. The probabilistic joint chance constraint may be given as $$\exists i \in \{1, \ldots, L_{KeepOut}\}$$

$$\mathbb{P}\{\mathcal{Y}_{t|k} \in \mathcal{O}_0(\varepsilon_{act}, \varepsilon_{meas}, \chi \backslash KeepOut_i)\} \geq \alpha_{out}$$

At block 713, optional individual chance constraints are obtained by utilizing the simple probability theory and the quantile reformulation of Gaussian chance constraints. The optional individual chance constraints may be given as $$\exists i \in \{1, \ldots, L_{KeepOut}\}, \forall j \in \{1, \ldots, L_{O_i}\}$$

$$p_{i,j}^T v_{t|k} + \sqrt{p_{ij}^T \Gamma_{t|k} p_{ij}} \, \Phi^{-1}\left(1 - \frac{1-\alpha_{out}}{N}\right) \leq q_{ij}$$

At block 715, the mixed-integer liner constraints are obtained based on the constraint tightening and the disjunctive programming. The mixed-integer liner constraints may be given as $$p_{i,j}^T v_{t|k} + \sqrt{p_{ij}^T \Gamma_{t|k} p_{ij}} \, \Phi^{-1}\left(1 - \frac{1-\alpha_{out}}{N}\right) \leq \quad \forall i \in \{1, \ldots, L_{KeepOut}\}, \quad (5)$$

$$q_{ij} + (1-\delta_{i,t}^{off})\mathcal{K}_{i,t}', \quad \forall j \in \{1, \ldots, L_{O_i}\}$$

$$\Sigma_{i \in} \delta_{i,t}^{off} \geq 1$$

$$\delta_{i,t}^{off} \in \{0, 1\}, \quad \forall i \in \{1, \ldots, L_{KeepOut}\}$$

Here, $\mathcal{K}_{i,t}$ is a sufficiently large value associated with big-M formulation of the disjunctive programming. The mixed-integer liner constraints (5) can be used instead of the chance constraint (1d).

Using the mixed-integer liner constraints (4) and (5) in the optimization problem (1), renders the optimization problem (1) as a mixed-integer program due to the presence of binary variables. For real-time implementation, feasible values to the binary variables may be pre-assigned to obtain a convex quadratic program.

Figure 8:
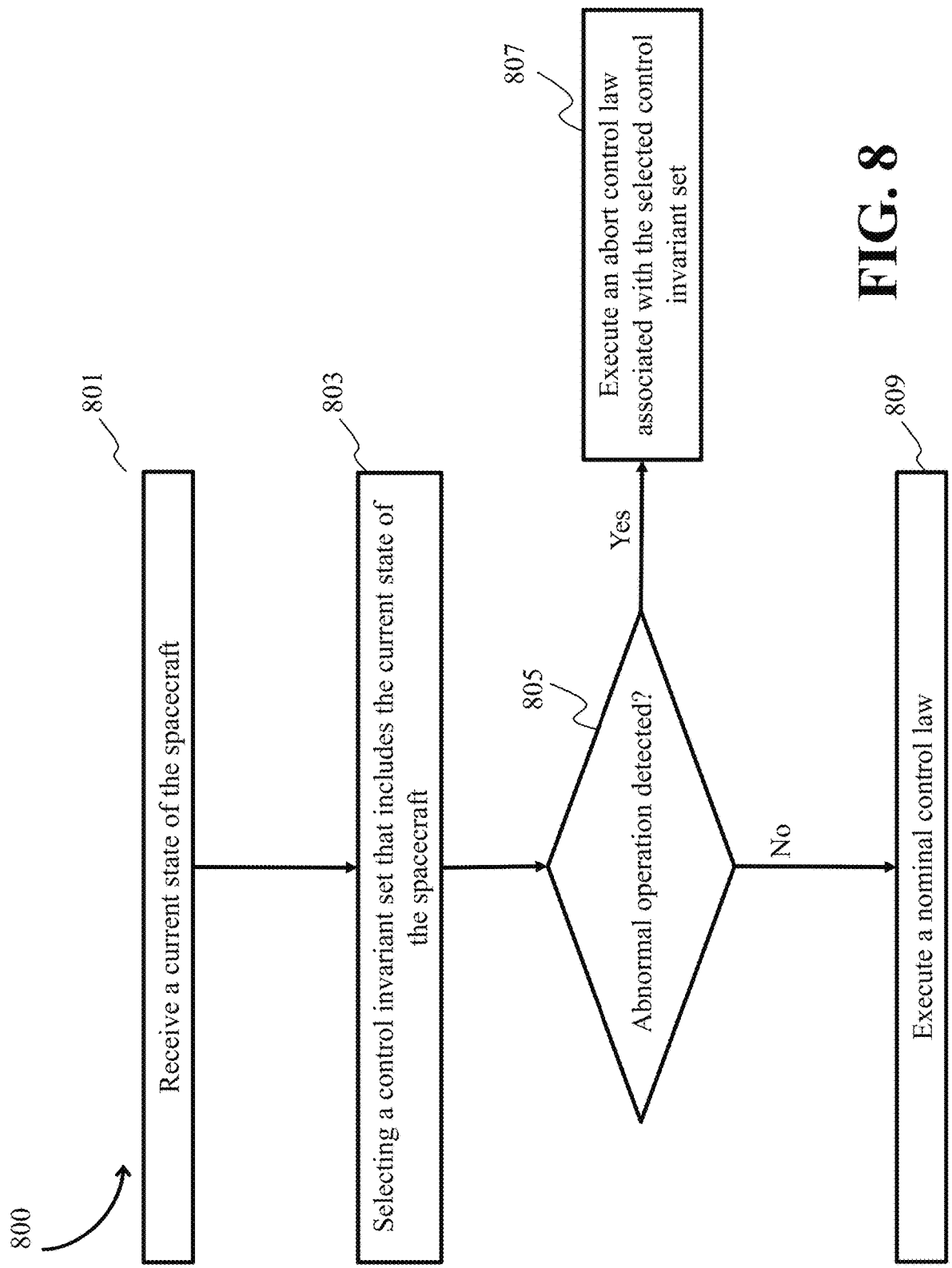
FIG. 8 shows a block diagram of a method for controlling the motion of the spacecraft while avoiding an unauthorized entry into a keep-away zone during the normal and the abnormal operation of the spacecraft.

FIG. 8 shows a block diagram of a method 800 for controlling the motion of the spacecraft 101 while avoiding the unauthorized entry into the keep-away zone 107 during the normal and the abnormal operation of the spacecraft 101.

At block 801, the method includes 800 receiving a current state of the spacecraft 101. At block 803, the method 800 includes selecting a control invariant set that includes the current state of the spacecraft 101.

At block, 805, the method includes determining if the abnormal operation is detected. If the abnormal operation is detected, then, at block 807, the method 800 includes executing an abort control law associated with the selected control invariant set. The abort control law produces abort control commands that moves the spacecraft 101 while avoiding the keep-away zone 107.

If the abnormal operation is not detected, then, at block 809, the method 800 includes executing the nominal control law. The nominal control law produces control commands that maintains the state of the spacecraft 101 within the control invariant set despite the internal and external forces acting on the spacecraft 101.

Figure 9:
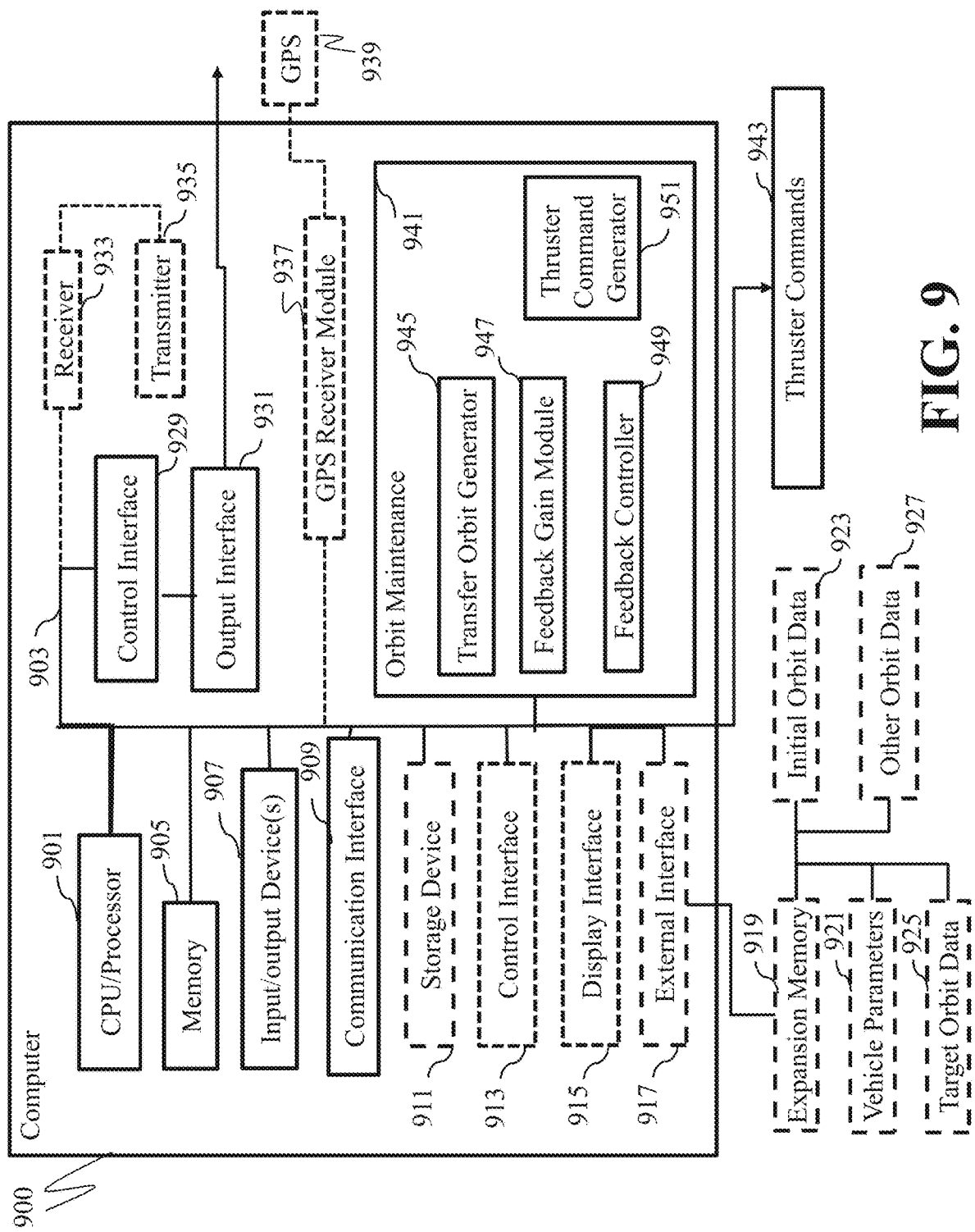
FIG. 9 is a schematic diagram illustrating some components used for implementing methods and systems of the present disclosure.

FIG. 9 is a schematic diagram illustrating some components used for implementing the methods and the systems of the present disclosure. For example, a computer 900 can be adapted for controlling the motion of the spacecraft 101 in the multi-object celestial system while avoiding the unauthorized entry into the keep-away zone 107 during the normal and the abnormal operation of the spacecraft. A CPU or processor(s) 901 can be connected via a bus system 903 to a memory 905, input/output devices 907 and a communication interface 909. Also, connected to the bus system 903 can be a storage device 911, a control interface 913, display interface 915, and an external interface 917.

The external interface 917 can be connected to an expansion memory 919, vehicle parameters 921 (i.e. spacecraft specifications, thruster specifications, size, weight, etc.), initial orbit data 923 (i.e. time, date, parameters including altitude, inclination, eccentricity, etc.), target orbit data 925, and other orbit data 927 (i.e. unique orbit data). The bus system 903 can also connect a control interface 929, an output interface 931, a receiver 933 and a transmitter 935. Further, the bus system 903 can connect a GPS receiver module 937 to a GPS 939. The computer 900 includes an orbit maintenance module 941. The orbit maintenance module 941 may output thruster commands 943. The orbit maintenance module 941 includes a transfer orbit generator 945, a feedback gain module 947, a feedback controller 949, and a thruster command generator 951.

The computer 900 can be a server or a desktop, a laptop, a mobile or other computer device or system with one or more processors 901. The processor 901 may be a central processing unit adapted for accessing code in the form of the transfer orbit generator 945 in the memory 905 or storage device 911 of the computer 900 (or in an expansion memory 919). Contemplated are external storage devices if further required depending upon the specific design and aspect of an intended hardware and goal implementation, according aspects related to the systems and the methods of the present disclosure. For example, the computer 900 can be used to implement the steps of the systems and methods, where the memory 905, and/or storage device 911 can store data.

The stored data in the memory 905 can include executable modules, vehicle data and historical space data. For example, the vehicle data can include specifications of the spacecraft, dimensions, weight, performance data under varied conditions including gravitation forces, and other perturbations, i.e. complex motion(s) of a massive body subject to forces other than the gravitational attraction of a single other massive body in space.

Further, the vehicle data can include data related to aspects related to vehicle dynamics associated with one or more of the multi-variables, i.e. (1) unusual orbital characteristics of a celestial body, i.e. a natural object which is located outside of Earth's atmosphere, such as the Moon, the Sun, an asteroid, planet, or star; (2) unusual orbital motion the celestial body; (3) celestial body's unusually close orbit around another celestial body; and (4) other known perturbations. The space data can include data related to celestial body(s) system, past missions to celestial body(s) and any other data related to space, the spacecraft and planning orbital designs to other celestial bodies in the universe. For example, the space data can include data about the moons of celestial body(s), such as characteristics of celestial body(s) that can be taken into consideration in developing orbital designs from an initial celestial body(s) orbit to a similar target celestial body(s) orbit.

The processor 901 of the computer 900 may be two or more processors depending upon the specific application. For example, some steps may require a separate processor to ensure a specific processing time or processing speed associated with the systems and methods of the present disclosure. The receiver 933 or input interface can receive space data that may be up-to-date space data, obtained from either an Earth Mission Control Center or sensors associated with the spacecraft, or some other location, after the stored historical space data stored in the memory 905. The receiver 933 and the transmitter 935 can provide a wireless venue for receiving and sending data to, for example, an Earth Mission Control Center, or some other destination. The GPS receiver module 937 connected to the GPS 939 can be used for navigation related aspects. The computer 900 may further include external devices, control interfaces, displays, sensors, machines, etc., that are contemplated for uses related to the systems and methods of the present disclosure.

Figure 10:
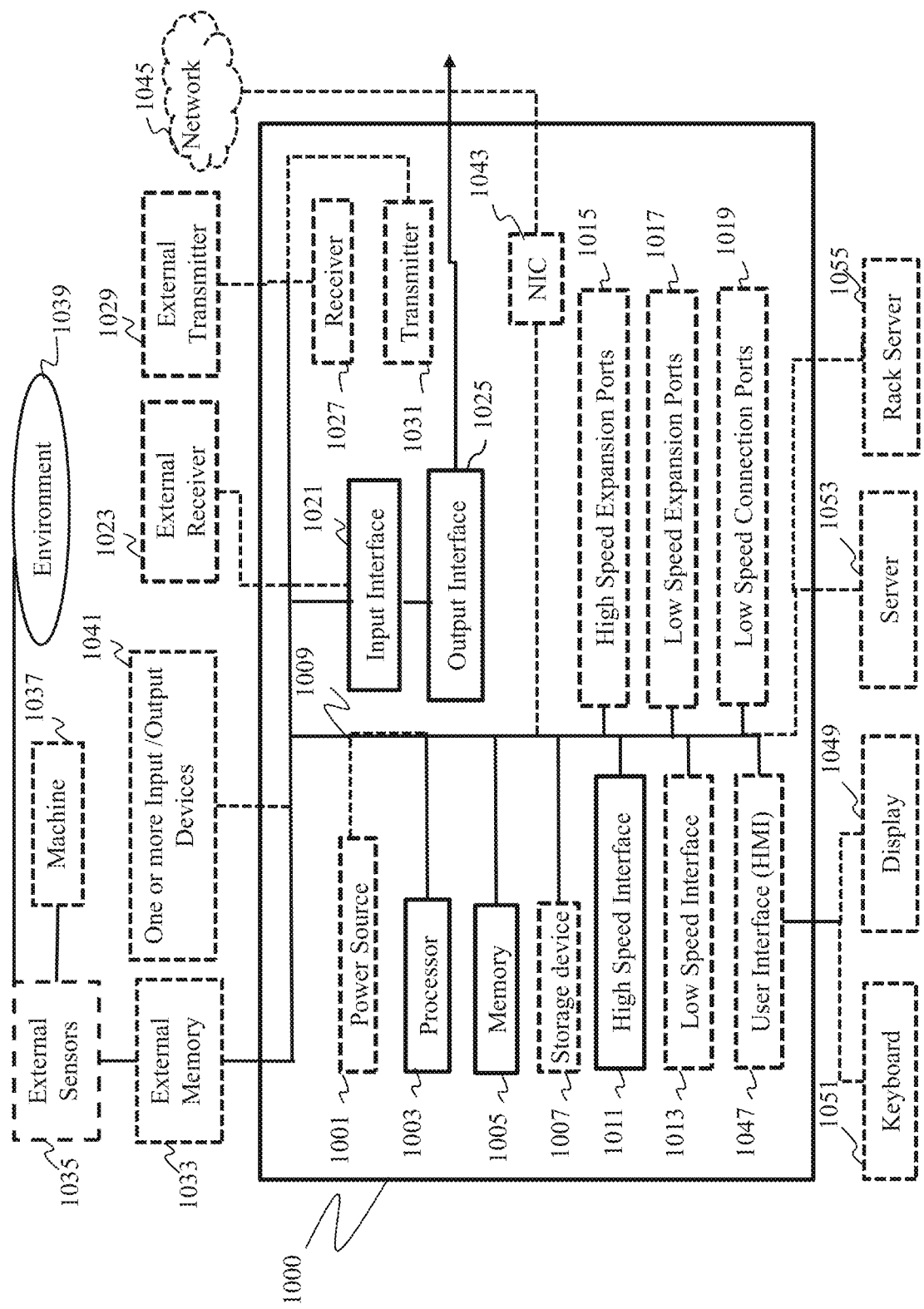
FIG. 10 is a schematic illustrating by non-limiting example a computing apparatus for implementing the methods and the systems of the present disclosure.

FIG. 10 is a schematic illustrating by non-limiting example a computing apparatus for implementing the methods and the systems of the present disclosure. The computing device 1000 can include a power source 1001, a processor 1003, a memory 1005, a storage device 1007, all connected to a bus 1009. Further, a high-speed interface 1011, a low-speed interface 1013, high-speed expansion ports 1015 and low speed connection ports 1017, can be connected to the bus 1009. In addition, a low-speed expansion port 1019 is in connection with the bus 1009. Further, an input interface 1021 can be connected via the bus 1009 to an external receiver 1023 and an output interface 1025. A receiver 1027 can be connected to an external transmitter 1029 and a transmitter 1031 via the bus 1009. Also connected to the bus 1009 can be an external memory 1033, external sensors 1035, machine(s) 1037, and an environment 1039. Further, one or more external input/output devices 1041 can be connected to the bus 1009. A network interface controller (NIC) 1043 can be adapted to connect through the bus 1009 to a network 1045, wherein data or other data, among other things, can be rendered on a third-party display device, third party imaging device, and/or third-party printing device outside of the computer device 1000.

The memory 1005 can store instructions that are executable by the computer device 1000, historical data, and any data that can be utilized by the methods and systems of the present disclosure. The memory 1005 can include random access memory (RAM), read only memory (ROM), flash memory, or any other suitable memory systems. The memory 1005 can be a volatile memory unit or units, and/or a non-volatile memory unit or units. The memory 1005 may also be another form of computer-readable medium, such as a magnetic or optical disk.

The storage device 1007 can be adapted to store supplementary data and/or software modules used by the computer device 1000. For example, the storage device 1007 can store historical data and other related data as mentioned above regarding the present disclosure. Additionally, or alternatively, the storage device 1007 can store historical data like data as mentioned above regarding the present disclosure. The storage device 1007 can include a hard drive, an optical drive, a thumb-drive, an array of drives, or any combinations thereof. Further, the storage device 1007 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 1003), perform one or more methods, such as those described above.

The computing device 1000 can be linked through the bus 1009, optionally, to a display interface or user Interface (HMI) 1047 adapted to connect the computing device 1000 to a display device 1049 and a keyboard 1051, wherein the display device 1049 can include a computer monitor, camera, television, projector, or mobile device, among others. In some implementations, the computer device 1000 may include a printer interface to connect to a printing device, wherein the printing device can include a liquid inkjet printer, solid ink printer, large-scale commercial printer, thermal printer, UV printer, or dye-sublimation printer, among others.

The high-speed interface 1011 manages bandwidth-intensive operations for the computing device 1000, while the low-speed interface 1013 manages lower bandwidth-intensive operations. Such allocation of functions is an example only. In some implementations, the high-speed interface 1011 can be coupled to the memory 1005, the user interface (HMI) 1047, and to the keyboard 1051 and the display 1049 (e.g., through a graphics processor or accelerator), and to the high-speed expansion ports 1015, which may accept various expansion cards via the bus 1009. In an implementation, the low-speed interface 1013 is coupled to the storage device 1007 and the low-speed expansion ports 1017, via the bus 1009. The low-speed expansion ports 1017, which may include various communication ports (e.g., USB, Bluetooth, Ethernet, wireless Ethernet) may be coupled to the one or more input/output devices 1041. The computing device 1000 may be connected to a server 1053 and a rack server 1055. The computing device 1000 may be implemented in several different forms. For example, the computing device 1000 may be implemented as part of the rack server 1055.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

We claim:

1. A controller for controlling a motion of a spacecraft in a multi-object celestial system while avoiding an unauthorized entry into a keep-away zone during a normal and an abnormal operation of the spacecraft, wherein the normal operation includes moving towards a target in the keep-away zone, and wherein the abnormal operation includes one or a combination of a failure to receive an authorization to enter the keep-away zone and a failure of at least one component of the spacecraft, the controller comprising: at least one processor; and a memory having instructions stored thereon that, when executed by the at least one processor, cause the controller to:

execute, during the normal operation of the spacecraft, a nominal control law subject to constraints on maintaining a state of the spacecraft within a union of a plurality of control invariant sets of values of the state of the spacecraft that partially or completely enclose the keep-away zone, wherein the state of the spacecraft includes a location of the spacecraft and at least one or a combination of a velocity and an acceleration of the spacecraft, wherein each of the plurality of control invariant sets is determined such that when the state of the spacecraft is within a control invariant set there is a control command produced by the nominal control law that maintains the state of the spacecraft within the control invariant set despite internal and external forces acting on the spacecraft, wherein the nominal control law solves at each time step, an optimization problem that minimizes a sum of squared distance of the spacecraft to the keep-away zone over time and an amount of energy expended by an open-loop control sequence subject to linear equality constraints describing evolution of a mean and a covariance matrix of a state and a measurement of the spacecraft; and execute, upon detecting the abnormal operation of the spacecraft, an abort control law associated with the control invariant set including a current state of the spacecraft, wherein at least some different abort control laws are associated with at least some different control invariant sets, and wherein the abort control law is jointly and interdependently determined for the corresponding control invariant set to produce abort control commands moving the spacecraft while avoiding the keep-away zone for any state within the corresponding control invariant set.

2. A spacecraft for moving in a multi-object celestial system, comprising:

the controller of claim 1;

a set of thrusters configured to change the state of a spacecraft according to a sequence of control commands produced by the nominal and the abort control laws;

a set of sensors configured to produce measurements indicative of the state of the spacecraft; and a circuitry configured to detect the abnormal operation of the spacecraft.

3. The controller of claim 1, wherein the controller is configured to avoid the unauthorized entry of the spacecraft into the keep-away zone with a prescribed safety likelihood while the motion of the spacecraft is subject to an unbounded stochastic uncertainty, wherein each of the control invariant set inner-approximates the values of the state of the spacecraft to guarantee control invariance with a first likelihood of the unbounded stochastic uncertainty greater than the prescribed safety likelihood, and wherein the nominal control law is configured to produce a control command maintaining the state of the spacecraft within the union of the plurality of control invariant sets with a second likelihood selected such that a product of the first likelihood and the second likelihood equals or greater than the prescribed safety likelihood.

4. The controller of claim 3, wherein each of the control invariant sets is a stochastic reachable set determined for a possible abnormal operation defined by the first likelihood of the unbounded stochastic uncertainty.

5. The controller of claim 3, wherein each of the control invariant sets is a robust control invariant set determined for the nominal control law with a bounded non-stochastic uncertainty corresponding to the first likelihood on the unbounded stochastic uncertainty.

6. The controller of claim 5, wherein the nominal control law is a model predictive control (MPC) with a model of dynamics of the spacecraft having the unbounded stochastic uncertainty, and the nominal control law ensures that the spacecraft stays within the robust controlled invariant sets with a second likelihood, along with other constraints including one or a combination of actuation constraints and nominal trajectory approaches the keep-away set without entering it.

7. The controller of claim 6, wherein the probabilistic distribution of process noise specifies one or a combination of an actuation mismatch of spacecraft thrusters and unmodeled dynamics of the motion of the spacecraft.

8. The controller of claim 6, wherein the unbounded stochastic uncertainty includes a probabilistic distribution of measurement noise of an estimation of the state of the spacecraft, wherein the MPC estimates a sequence of control steps over a prediction horizon acting on the spacecraft with the state having a bounded measurement noise with a range of values bounded to have a likelihood on the probabilistic distribution of the measurement noise greater than the first likelihood.

9. The controller of claim 8, wherein the state of the spacecraft is determined by a probabilistic filter subject to the measurement noise.

10. The controller of claim 9, wherein the probabilistic filter includes one or a combination of a Kalman filter and a particle filter.

11. The controller of claim 3, wherein the constraints maintaining the state of the spacecraft within the union of the plurality of control invariant sets require their satisfaction with the second likelihood.

12. The controller of claim 11, wherein the constraints include a chance constraint.

13. The controller of claim 11, wherein the constraints include one or a combination of a chance constraint requiring the state of the spacecraft be outside the keep-away zone, an actuation constraint, and a chance constraint requiring measurements of the spacecraft be within the plurality of control invariant sets.

14. A method for controlling a motion of a spacecraft in a multi-object celestial system while avoiding an unauthorized entry into a keep-away zone during a normal and an abnormal operation of the spacecraft, wherein the normal operation includes moving toward the keep-away zone, and wherein the abnormal operation includes one or a combination of a failure to receive an authorization to enter the keep-away zone and a failure of at least one component of the spacecraft, the method comprising:

executing, during the normal operation of the spacecraft, a nominal control law subject to constraints on maintaining a state of the spacecraft within a union of a plurality of control invariant sets of values of the state of the spacecraft that partially or completely enclose the keep-away zone, wherein the state of the spacecraft includes a location of the spacecraft and at least one or a combination of a velocity and an acceleration of the spacecraft, wherein each of the plurality of control invariant sets is determined such that when the state of the spacecraft is within a control invariant set there is a control command produced by the nominal control law that maintains the state of the spacecraft within the control invariant set despite internal and external forces acting on the spacecraft, wherein the nominal control law solves at each time step, an optimization problem that minimizes a sum of squared distance of the spacecraft to the keep-away zone over time and an amount of energy expended by an open-loop control sequence subject to linear equality constraints describing evolution of a mean and a covariance matrix of a state and a measurement of the spacecraft; and executing, upon detecting the abnormal operation of the spacecraft, an abort control law associated with the control invariant set including a current state of the spacecraft, wherein at least some different abort control laws are associated with at least some different control invariant sets, and wherein the abort control law is jointly and interdependently determined for the corresponding control invariant set to produce abort control commands moving the spacecraft while avoiding the keep-away zone for any state within the corresponding control invariant set.

15. The method of claim 14, wherein the method further comprises avoiding the unauthorized entry of the spacecraft into the keep-away zone with a prescribed safety likelihood while the motion of the spacecraft is subject to an unbounded stochastic uncertainty, wherein each of the control invariant set inner-approximates the values of the state of the spacecraft to guarantee control invariance with a first likelihood of the unbounded stochastic uncertainty greater than the prescribed safety likelihood, and wherein the nominal control law is configured to produce a control command maintaining the state of the spacecraft within the union of the plurality of control invariant sets with a second likelihood selected such that a product of the first likelihood and the second likelihood equals or greater than the prescribed safety likelihood.

16. The method of claim 15, wherein each of the control invariant sets is a stochastic reachable set determined for a possible abnormal operation by the first likelihood of the unbounded stochastic uncertainty.

17. The method of claim 15, wherein each of the control invariant sets is a robust control invariant set determined for the nominal control law with a bounded non-stochastic uncertainty corresponding to the first likelihood on the unbounded stochastic uncertainty.

18. The method of claim 16, wherein the unbounded stochastic uncertainty includes a probabilistic distribution of process noise.

19. A non-transitory computer-readable storage medium embodied thereon a program executable by a processor for performing a method for controlling a motion of a spacecraft in a multi-object celestial system while avoiding an unauthorized entry into a keep-away zone during a normal and an abnormal operation of the spacecraft, wherein the normal operation includes moving toward the keep-away zone, and wherein the abnormal operation includes one or a combination of a failure to receive an authorization to enter the keep-away zone and a failure of at least one component of the spacecraft, the method comprising:

executing, during the normal operation of the spacecraft, a nominal control law subject to constraints on maintaining a state of the spacecraft within a union of a plurality of control invariant sets of values of the state of the spacecraft that partially or completely enclose the keep-away zone, wherein the state of the spacecraft includes a location of the spacecraft and at least one or a combination of a velocity and an acceleration of the spacecraft, wherein each of the plurality of control invariant sets is determined such that when the state of the spacecraft is within a control invariant set there is a control command produced by the nominal control law that maintains the state of the spacecraft within the control invariant set despite internal and external forces acting on the spacecraft, wherein the nominal control law solves at each time step, an optimization problem that minimizes a sum of squared distance of the spacecraft to the keep-away zone over time and an amount of energy expended by an open-loop control sequence subject to linear equality constraints describing evolution of a mean and a covariance matrix of a state and a measurement of the spacecraft; and executing, upon detecting the abnormal operation of the spacecraft, an abort control law associated with the control invariant set including a current state of the spacecraft, wherein at least some different abort control laws are associated with at least some different control invariant sets, and wherein the abort control law is jointly and interdependently determined for the corresponding control invariant set to produce abort control commands moving the spacecraft while avoiding the keep-away zone for any state within the corresponding control invariant set.

* * * * *